US008624933B2

(12) United States Patent
Marr et al.

(10) Patent No.: US 8,624,933 B2
(45) Date of Patent: Jan. 7, 2014

(54) DEVICE, METHOD, AND GRAPHICAL USER INTERFACE FOR SCROLLING A MULTI-SECTION DOCUMENT

(75) Inventors: Jason Robert Marr, Cupertino, CA (US); Akiva Leffert, San Francisco, CA (US); Peter William Rapp, Pittsburgh, PA (US); Christopher Douglas Weeldreyer, San Carlos, CA (US); Jay Christopher Capela, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 890 days.

(21) Appl. No.: 12/567,717

(22) Filed: Sep. 25, 2009

(65) Prior Publication Data

US 2011/0074699 A1  Mar. 31, 2011

(51) Int. Cl.
 *G09G 5/00* (2006.01)
 *G06F 3/041* (2006.01)
(52) U.S. Cl.
 USPC .......................................... 345/684; 345/173
(58) Field of Classification Search
 None
 See application file for complete search history.

(56) References Cited

U.S. PATENT DOCUMENTS

| | | | |
|---|---|---|---|
| 4,837,798 A | 6/1989 | Cohen et al. | |
| 4,935,954 A | 6/1990 | Thompson et al. | |
| 4,972,462 A | 11/1990 | Shibata | |
| 5,003,577 A | 3/1991 | Ertz et al. | |
| 5,164,982 A | 11/1992 | Davis | |
| 5,202,961 A | 4/1993 | Mills et al. | |
| 5,283,818 A | 2/1994 | Klausner et al. | |
| 5,333,266 A | 7/1994 | Boaz et al. | |
| 5,390,236 A | 2/1995 | Klausner et al. | |
| 5,463,725 A * | 10/1995 | Henckel et al. | 715/776 |
| 5,510,808 A | 4/1996 | Cina, Jr. et al. | 345/123 |
| 5,524,140 A | 6/1996 | Klausner et al. | |
| 5,550,559 A | 8/1996 | Isensee et al. | 345/124 |

(Continued)

FOREIGN PATENT DOCUMENTS

| | | |
|---|---|---|
| AU | 2008 100011 | 2/2008 |
| CN | 1673939 A | 9/2005 |

(Continued)

OTHER PUBLICATIONS

International Search Report and Written Opinion dated Nov. 15, 2010, received in International Application No. PCT/US10/48443, which corresponds to U.S. Appl. No. 12/567,717.

(Continued)

*Primary Examiner* — Peter Vincent Agustin
(74) *Attorney, Agent, or Firm* — Morgan, Lewis & Bockius LLP

(57) ABSTRACT

A method for scrolling a multi-section document is disclosed, including displaying on a display an electronic document that includes a plurality of document sections separated by respective logical structure boundaries; detecting a gesture on a touch-sensitive surface, the gesture having an initial velocity that exceeds a predefined speed threshold such that the gesture will scroll the electronic document more than one document section; initiating scrolling of the electronic document on the display at the initial velocity in accordance with an initial scrolling speed versus scrolling distance function; while scrolling the electronic document, adjusting the scrolling speed versus scrolling distance function so that when the scrolling speed becomes zero, a first logical structure boundary in the electronic document is displayed at a predefined location on the display; and, scrolling the electronic document in accordance with the adjusted scrolling speed versus scrolling distance function.

25 Claims, 28 Drawing Sheets

(56) References Cited

U.S. PATENT DOCUMENTS

| | | | |
|---|---|---|---|
| 5,559,301 A | 9/1996 | Bryan et al. | |
| 5,572,576 A | 11/1996 | Klausner et al. | |
| 5,657,434 A * | 8/1997 | Yamamoto et al. | 345/684 |
| 5,745,716 A | 4/1998 | Tchao et al. | 395/350 |
| 5,809,267 A | 9/1998 | Moran et al. | |
| 5,825,308 A | 10/1998 | Rosenberg | 341/20 |
| 5,835,923 A * | 11/1998 | Shibata et al. | 715/246 |
| 5,844,547 A | 12/1998 | Minakuchi et al. | 345/173 |
| 5,859,638 A | 1/1999 | Coleman et al. | 345/341 |
| 5,936,623 A | 8/1999 | Amro | |
| 5,943,052 A | 8/1999 | Allen et al. | |
| 5,973,676 A | 10/1999 | Kawakura | |
| 6,073,036 A | 6/2000 | Heikkinen et al. | 455/575 |
| 6,262,724 B1 | 7/2001 | Crow et al. | |
| 6,278,443 B1 | 8/2001 | Amro et al. | 345/173 |
| 6,323,846 B1 * | 11/2001 | Westerman et al. | 345/173 |
| 6,335,722 B1 | 1/2002 | Tani et al. | |
| 6,337,698 B1 | 1/2002 | Keely, Jr. et al. | |
| 6,340,979 B1 | 1/2002 | Beaton et al. | 345/764 |
| 6,342,902 B1 | 1/2002 | Harradine et al. | |
| 6,353,442 B1 | 3/2002 | Masui | |
| 6,430,574 B1 | 8/2002 | Stead | |
| 6,462,752 B1 * | 10/2002 | Ma et al. | 345/684 |
| 6,469,695 B1 | 10/2002 | White | 345/173 |
| 6,542,171 B1 | 4/2003 | Satou et al. | |
| 6,570,557 B1 | 5/2003 | Westerman et al. | 345/173 |
| 6,677,932 B1 | 1/2004 | Westerman | 345/173 |
| 6,677,965 B1 | 1/2004 | Ullmann et al. | |
| 6,687,664 B1 | 2/2004 | Sussman et al. | |
| 6,690,387 B2 | 2/2004 | Zimmerman et al. | 345/684 |
| 6,788,292 B1 | 9/2004 | Nako et al. | |
| 6,865,718 B2 | 3/2005 | Levi Montalcini | 715/786 |
| 6,922,816 B1 | 7/2005 | Amin et al. | |
| 6,954,899 B1 | 10/2005 | Anderson | 715/701 |
| 6,966,037 B2 | 11/2005 | Fredriksson et al. | 715/830 |
| 7,007,239 B1 | 2/2006 | Hawkins et al. | |
| 7,054,965 B2 | 5/2006 | Bell et al. | 710/72 |
| 7,082,163 B2 | 7/2006 | Uenoyama et al. | 375/240.12 |
| 7,152,210 B1 | 12/2006 | Van Den Hoven et al. | 715/723 |
| 7,223,316 B2 | 5/2007 | Murase | |
| 7,312,785 B2 | 12/2007 | Tsuk et al. | |
| 7,312,790 B2 | 12/2007 | Sato et al. | 345/173 |
| 7,404,152 B2 | 7/2008 | Zinn et al. | 715/864 |
| 7,408,538 B2 | 8/2008 | Hinckley et al. | |
| 7,436,395 B2 | 10/2008 | Chiu et al. | 345/173 |
| 7,469,381 B2 | 12/2008 | Ording | |
| 7,479,949 B2 | 1/2009 | Jobs et al. | 345/173 |
| 7,786,975 B2 | 8/2010 | Ording et al. | |
| 7,822,443 B2 * | 10/2010 | Kim et al. | 455/566 |
| 7,996,792 B2 | 8/2011 | Anzures et al. | |
| 8,032,298 B2 | 10/2011 | Han | |
| 2002/0015024 A1 | 2/2002 | Westerman et al. | 345/173 |
| 2002/0030667 A1 * | 3/2002 | Hinckley et al. | 345/173 |
| 2002/0080151 A1 | 6/2002 | Venolia | |
| 2002/0089545 A1 | 7/2002 | Montalcini | |
| 2002/0118169 A1 | 8/2002 | Hinckley et al. | |
| 2002/0122066 A1 | 9/2002 | Bates et al. | |
| 2002/0130891 A1 * | 9/2002 | Singer | 345/684 |
| 2002/0135602 A1 * | 9/2002 | Davis et al. | 345/684 |
| 2002/0143741 A1 | 10/2002 | Laiho et al. | 707/1 |
| 2002/0154173 A1 | 10/2002 | Etgen et al. | |
| 2002/0186252 A1 | 12/2002 | Himmel et al. | 345/787 |
| 2002/0191029 A1 | 12/2002 | Gillespie et al. | |
| 2002/0196238 A1 * | 12/2002 | Tsukada et al. | 345/173 |
| 2003/0008679 A1 | 1/2003 | Iwata et al. | 455/556 |
| 2003/0043174 A1 | 3/2003 | Hinckley et al. | |
| 2003/0076301 A1 | 4/2003 | Tsuk et al. | 345/159 |
| 2003/0076306 A1 | 4/2003 | Zadesky et al. | 345/173 |
| 2003/0122787 A1 * | 7/2003 | Zimmerman et al. | 345/173 |
| 2003/0128192 A1 | 7/2003 | van Os | 345/173 |
| 2003/0131317 A1 | 7/2003 | Budka et al. | 715/514 |
| 2003/0226152 A1 | 12/2003 | Billmaier et al. | 725/135 |
| 2004/0100479 A1 | 5/2004 | Nakano et al. | 345/700 |
| 2004/0143796 A1 | 7/2004 | Lerner et al. | |
| 2004/0189714 A1 | 9/2004 | Fox et al. | |
| 2004/0252109 A1 | 12/2004 | Trent, Jr. et al. | 345/174 |
| 2005/0012723 A1 | 1/2005 | Pallakoff | 345/173 |
| 2005/0024345 A1 | 2/2005 | Eastty et al. | |
| 2005/0071437 A1 | 3/2005 | Bear et al. | |
| 2005/0097468 A1 | 5/2005 | Montalcini | |
| 2005/0177445 A1 | 8/2005 | Church | |
| 2005/0210403 A1 | 9/2005 | Satanek | 715/786 |
| 2005/0216839 A1 | 9/2005 | Salvucci | |
| 2006/0007174 A1 | 1/2006 | Shen | |
| 2006/0010400 A1 | 1/2006 | Dehlin et al. | |
| 2006/0015819 A1 | 1/2006 | Hawkins et al. | |
| 2006/0018446 A1 | 1/2006 | Schmandt et al. | |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0036942 A1 | 2/2006 | Carter | |
| 2006/0038785 A1 | 2/2006 | Hinckley et al. | |
| 2006/0038796 A1 * | 2/2006 | Hinckley et al. | 345/173 |
| 2006/0184901 A1 | 8/2006 | Dietz | 715/855 |
| 2006/0234680 A1 | 10/2006 | Doulton | |
| 2006/0236262 A1 | 10/2006 | Bathiche et al. | |
| 2006/0239419 A1 | 10/2006 | Joseph et al. | |
| 2006/0253547 A1 | 11/2006 | Wood et al. | 709/217 |
| 2006/0268020 A1 | 11/2006 | Han | |
| 2006/0290666 A1 | 12/2006 | Crohas | |
| 2007/0002018 A1 | 1/2007 | Mori | |
| 2007/0038953 A1 * | 2/2007 | Keohane et al. | 715/784 |
| 2007/0080936 A1 | 4/2007 | Tsuk et al. | |
| 2007/0132789 A1 | 6/2007 | Ording et al. | 345/684 |
| 2007/0146337 A1 * | 6/2007 | Ording et al. | 345/173 |
| 2007/0150830 A1 | 6/2007 | Ording et al. | 715/784 |
| 2007/0192744 A1 | 8/2007 | Reponen | |
| 2007/0198111 A1 | 8/2007 | Oetzel et al. | |
| 2007/0220442 A1 | 9/2007 | Bohan et al. | |
| 2007/0220443 A1 | 9/2007 | Cranfill et al. | |
| 2008/0027637 A1 * | 1/2008 | Sakano | 701/209 |
| 2008/0034289 A1 | 2/2008 | Doepke et al. | |
| 2008/0040692 A1 | 2/2008 | Sunday et al. | |
| 2008/0042984 A1 | 2/2008 | Lim et al. | 345/173 |
| 2008/0055257 A1 | 3/2008 | Peng | |
| 2008/0055264 A1 | 3/2008 | Anzures et al. | |
| 2008/0056459 A1 | 3/2008 | Vallier et al. | |
| 2008/0071810 A1 | 3/2008 | Casto et al. | |
| 2008/0082939 A1 | 4/2008 | Nash et al. | |
| 2008/0084399 A1 | 4/2008 | Chua et al. | |
| 2008/0126933 A1 | 5/2008 | Gupta et al. | |
| 2008/0155417 A1 | 6/2008 | Vallone et al. | |
| 2008/0163131 A1 | 7/2008 | Hirai et al. | |
| 2008/0165141 A1 | 7/2008 | Christie | |
| 2008/0168384 A1 | 7/2008 | Platzer et al. | |
| 2008/0168395 A1 | 7/2008 | Ording et al. | |
| 2008/0190266 A1 | 8/2008 | Kim et al. | |
| 2008/0207176 A1 | 8/2008 | Brackbill et al. | |
| 2008/0211785 A1 | 9/2008 | Hotelling et al. | |
| 2008/0259040 A1 | 10/2008 | Ording et al. | 345/173 |
| 2008/0320391 A1 | 12/2008 | Lemay et al. | |
| 2009/0006958 A1 | 1/2009 | Pohjola et al. | |
| 2009/0058822 A1 | 3/2009 | Chaudhri | |
| 2009/0075694 A1 | 3/2009 | Kim et al. | |
| 2009/0144623 A1 | 6/2009 | Jung | |
| 2009/0158149 A1 * | 6/2009 | Ko | 715/702 |
| 2009/0160804 A1 * | 6/2009 | Chang et al. | 345/173 |
| 2009/0174667 A1 | 7/2009 | Kocienda et al. | |
| 2009/0178008 A1 | 7/2009 | Herz et al. | |
| 2009/0199119 A1 | 8/2009 | Park et al. | |
| 2009/0228792 A1 | 9/2009 | van Os et al. | |
| 2010/0013782 A1 | 1/2010 | Liu et al. | |
| 2010/0058228 A1 | 3/2010 | Park | |
| 2010/0060586 A1 | 3/2010 | Pisula et al. | |
| 2010/0125785 A1 | 5/2010 | Moore et al. | |
| 2010/0134425 A1 | 6/2010 | Storrusten | |
| 2010/0162181 A1 | 6/2010 | Shiplacoff et al. | |
| 2010/0175018 A1 | 7/2010 | Petschnigg et al. | |
| 2010/0231534 A1 | 9/2010 | Chaudhri et al. | |
| 2011/0050594 A1 | 3/2011 | Kim et al. | |
| 2011/0074699 A1 * | 3/2011 | Marr et al. | 345/173 |
| 2011/0163967 A1 * | 7/2011 | Chaudhri | 345/173 |

(56) References Cited

U.S. PATENT DOCUMENTS

FOREIGN PATENT DOCUMENTS

| | | | |
|---|---|---|---|
| DE | 196 21 593 A1 | 12/1997 |
| DE | 298 24 936 U1 | 8/2003 |
| DE | 10 2004 029 203 | 12/2005 |
| EP | 0 679 005 A1 | 10/1995 |
| EP | 0 684 543 A1 | 11/1995 |
| EP | 0 795 811 A1 | 9/1997 |
| EP | 0 994 409 A2 | 10/1999 |
| EP | 0 961 199 A | 12/1999 |
| EP | 1 058 181 A1 | 12/2000 |
| EP | 1 615 109 A2 | 1/2006 |
| EP | 1 727 032 A2 | 11/2006 |
| EP | 1 942 401 A1 | 7/2008 |
| KR | 2002-0069952 A | 9/2005 |
| WO | WO 93/20640 | 10/1993 |
| WO | WO 94/17469 | 8/1994 |
| WO | WO 99/16181 A | 4/1999 |
| WO | WO 00/63766 A1 | 10/2000 |
| WO | WO 01/02949 | 1/2001 |
| WO | WO 01/29702 A2 | 4/2001 |
| WO | WO 2004/111816 A2 | 12/2004 |
| WO | WO 2005/010725 A2 | 2/2005 |
| WO | WO 2006/020304 A2 | 2/2006 |
| WO | WO 2006/020305 A2 | 2/2006 |

OTHER PUBLICATIONS

Notice of Acceptance dated Sep. 14, 2010, received in Australian Application No. 2006321681, which corresponds to U.S. Appl. No. 11/322,553.
Office Action dated Nov. 9, 2010, received in Chinese Patent Application No. 200680052109.3, which corresponds to U.S. Appl. No. 11/322,553.
Ahlberg,C. et al., "The Alphaslider: A Compact and Rapid SAhlberg,C. et al., The Alphaslider: A Compact and Rapid Selector," ACM, Apr. 1994, proceedings of the SIGCHI conference on Human Factors in Computing Systems, pp. 365-371.
Bederson, B, "Fisheye Menus," Human-Computer Interaction Lab, Institute for Advanced Computer Studies, Computer Science Department, University of Maryland, College Park, ACM 2000, 9 pages.
Esato, "A Couple of My Mates. Meet JasJar and K-Jam (Many Pies)," 90 pages, Apr. 13, 2006.
Hinckley et al., "Quantitative Analysis of Scrolling Techniques," CHI 2002 Conf. on Human Factors in Computing Systems, pp. 65-72 (CHI Letters, vol. 4, No. 1), 2002.
Miller, D., "Personal/Java Application Environment," Jun. 8, 1999, 12 pages. http://java.sun.com/products/personaljava/touchable/.
Potala Software, "Potala Telly," Oct. 19, 2005, pp. 1-6, http://web.archive.org/web/20051019000340/www.potatasoftware.com/telly.aspx.
Ramos, G., "Zliding: Fluid Zooming and Sliding for High Precision Parameter Manipulation," Oct. 2005, Proceedings of the 18th annual ACM Symposium on User Interface Software and Technology, pp. 143-152.
Rekimoto, J, "SmartSkin: An Infrastructure for Freehand Manipulation on Interactive Surfaces," CHI 2002, Apr. 20-25, 2002, 8 pages.
Smith, R., "Sygic. Mobile Contacts," Sep. 2, 2004, 13 pages, http://www.pocketnow.com/index.php?a=portal_detail&id=467.
International Search Report and Written Opinion dated Nov. 22, 2007, received in International Application No. PCT/US2006/061333, which corresponds to U.S. Appl. No. 11/322,551.
International Search Report and Written Opinion dated Feb. 15, 2008, received in International Application No. PCT/US2006/061337, which corresponds to U.S. Appl. No. 11/322,553.
European Search Report dated Sep. 2, 2009, received in European Application No. 09162953.5-1527, which corresponds to U.S. Appl. No. 11/322,553.
International Search Report dated Apr. 26, 2007, received in International Application No. PCT/US2006/061627, which corresponds to U.S. Appl. No. 11/322,547.
Office Action dated Dec. 18, 2008, received in U.S. Appl. No. 11/322,551.
Office Action dated Jun. 15, 2009, received in U.S. Appl. No. 11/322,551.
Office Action dated Sep. 22, 2009, received in U.S. Appl. No. 11/322,551.
Office Action dated Mar. 12, 2010, received in U.S. Appl. No. 11/322,551.
Notice of Allowance dated Jul. 21, 2010, received in U.S. Appl. No. 11/322,551.
Office Action dated Jun. 15, 2007, received in U.S. Appl. No. 11/322,553.
Office Action dated Feb. 5, 2008, received in U.S. Appl. No. 11/322,553.
Office Action dated Aug. 5, 2008, received in U.S. Appl. No. 11/322,553.
Office Action dated Dec. 26, 2008, received in U.S. Appl. No. 11/322,553.
Office Action dated Jun. 17, 2009, received in U.S. Appl. No. 11/322,553.
Office Action dated Apr. 5, 2010, received in U.S. Appl. No. 11/322,553.
Office Action dated Sep. 1, 2009, received in Australian patent application No. 2006321681, which corresponds to U.S. Appl. No. 11/322,553.
Office Action dated Dec. 23, 2009, received in Australian patent application No. 2006321681, which corresponds to U.S. Appl. No. 11/322,553.
Office Action dated Jan. 8, 2010, received in Chinese Patent Application No. 200680052109.3, which corresponds to U.S. Appl. No. 11/322,553.
Office Action dated Sep. 8, 2009, received in German patent application No. 11 2006 003 309.3-53 which corresponds to U.S. Appl. No. 11/322,553.
Office Action dated Sep. 2, 2009, issued in European Application No. 09162953.5, which corresponds to U.S. Appl. No. 11/322,553.
Office Action dated May 31, 2010, received in Korean Application No. 10-2008-7016570, which corresponds to U.S. Appl. No. 11/322,553, 5 pages.
Office Action dated Oct. 30, 2007 received in U.S. Appl. No. 11/322,547.
Office Action dated Jun. 9, 2008, received in U.S. Appl. No. 11/322,547.
Office Action dated Aug. 22, 2008, received in U.S. Appl. No. 11/322,547.
Office Action dated Feb. 5, 2009, received in U.S. Appl. No. 11/322,547.
Office Action dated Aug. 6, 2009, received in U.S. Appl. No. 11/322,547.
Final Office Action dated May 28, 2010, received in U.S. Appl. No. 11/322,547.
Notice of Allowance dated Aug. 6, 2010, received in U.S. Appl. No. 11/322,547.
Office Action dated Jan. 8, 2010, received in Chinese Patent Application No. 200680052778.0, which corresponds to U.S. Appl. No. 11/322,547.
Office Action dated Aug. 11, 2010, received in Chinese Application No. 200680052778.0, which corresponds to U.S. Appl. No. 11/322,547.
Office Action dated Oct. 14, 2009, received in German Patent Application No. A116012WODE, which corresponds to U.S. Appl. No. 11/322,547.
Office Action dated Apr. 21, 2009, received in the European Patent Application which corresponds to U.S. Appl. No. 11/322,547.
Office Action dated May 31, 2010, received in Korean Patent Application No. 10-2008-7017977, which corresponds to U.S. Appl. No. 11/322,547.
Roth et al., "Bezel Swipe: Conflict-Free Scrolling and Multiple Selection on Mobile Touch Screen Devices," Proceedings of the 27th International Conference on Human Factors in Computing Systems, Apr. 8, 2009, Boston MA, pp. 1523-1526.

(56) References Cited

OTHER PUBLICATIONS

International Search Report and Written Opinion dated May 11, 2011, received in International Application No. PCT/US2010/062319, which corresponds to U.S. Appl. No. 12/788,279.
Office Action dated Jan. 5, 2011, received in Korean Patent Application No. 10-2009-7011991, which corresponds to U.S. Appl. No. 11/322,553.
Notice of Allowance dated Oct. 19, 2012, received in U.S. Appl. No. 12/240,974, 13 pages (Gehani).
Office Action dated Jun. 7, 2012, received in U.S. Appl. No. 12/566,673. 20 pages (Pisula).
Office Action dated Sep. 27, 2012, received in U.S. Appl. No. 12/788,279, 28 pages (Chaudhri).
Office Action dated Jun. 7, 2012, received in U.S. Appl. No. 12/566,673, 20 pages (Pisula).
European Search Report dated Mar. 1, 2013, received in European Patent Application No. 10176624.4, which corresponds to U.S. Appl. No. 12/567,7147, 7 pages (Marr).
Final Office Action dated Nov. 23, 2012, received in U.S. Appl. No. 12/566,669, 37 pages (Chaudhri).
Final Office Action dated Nov. 21, 2012, received in U.S. Appl. No. 12/566,638, 23 pages (Ording).
Final Office Action dated Dec. 20, 2012, received in U.S. Appl. No. 12/566,671, 28 pages (Chaudhri).
Office Action dated Nov. 8, 2012, received in U.S. Appl. No. 12/566,672, 11/ pages (Chaudhri).
Notice of Allowance dated Mar. 1, 2013, received in U.S. Appl. No. 12/566,672, 16 pages (Chaudhri).
Final Office Action dated Jan. 17, 2013, received in U.S. Appl. No. 12/566,673, 30 pages (Pisula).
Ahlberg, C. et al., "The Alphaslider: A Compact and Rapid Selector," ACM, Apr. 1994, proceedings of the SIGCHI Conference on Human Factors in Computing Systems, pp. 365-371.
Arons, B., "The Audio-Graphical Interface to a Personal Integrated Telecommunications System," Massachusetts Institute of Technology, Department of Architecture Master Thesis, Jun. 1984, 88 pages.
Coleman, D., "Meridian Mail Voice Mail System Integrates Voice Processing and Personal Computing," Speech Teehnology, vol. 4, No. 2, Mar./Apr. 1988, 7 pages.
Microsoft Corporation, Microsoft Office Word 2003 (SP2), 1983-2003, Microsoft Corporation, SP3 as of 2005, 5 pages MSWord 2003 Figures 1-5.
Microsoft Word 2000 (9.0.2720), 1999, Microsoft Corporation, 5 Pages MSWord figures 1-5.
Myers, B., "Shortcutter for Palm," The Pittsburgh Pebbles FDA Project, printed Dec. 19, 2006, 11 pages http://www.cs.cmu.edu/~pebbles/v5/shortcutter/palm/index.html.
Northern Telecom, "Meridian Mail PC User Guide," 17 pages.
Schmandt, C. et al., "A Conversational Telephone Messaging System," IEEE Transactions on Consumer Electronics, Aug. 1984, vol. CE-30, 4 pages.
Schmandt, C. et al., "Phone Slave: A Graphical Telecommunications Interface," Proceeding of the SID, vol. 26/1, 1985, 4 pages.
Schmandt, C. et al., "Phone Slave: A Graphical Telecommunications Interface," Society For Information Display, 1984 International Symposium Digest of Technical Papers, Jun. 1984, San Francisco, CA, 4 pages.
International Search Report and Written Opinion dated Feb. 21, 2008, received in International Application No. PCT/US2007/077443, which corresponds to U.S. Appl. No. 11/770,720, 11 pages (Anzures).
International Search Report and Written Opinion dated Jul. 4, 2008, received in International Application No. PCT/US2008/050083, which corresponds to U.S. Appl. No. 11/968,064, 14 pages (Ording).
International Search Report and Written Opinion dated Jun. 2, 2009, received in International Application No. PCT/US2008/086538, which corresponds to U.S. Appl. No. 12/240,974, 19 pages (Gehani).
International Preliminary Report on Patentability dated Jul. 15, 2010, received in International Application No. PCT/US2008/086538, which corresponds to U.S. Appl. No. 12/240,974, 11 pages (Gehani).
International Search Report and Written Opinion dated Jun. 18, 2010, received in International Application No. PCT/US2010/027088, which corresponds to U.S. Appl. No. 12/566,669, 13 pages (Chaudhri).
Office Action dated May 5, 2011, received in Chinese Patent Application No. 200680052109.3, which corresponds to U.S. Appl. No. 11/322,553, 9 pages (Ording).
Office Action dated Jan. 10, 2012, received in Chinese Patent Application No. 200680052109.3, which corresponds to U.S. Appl. No. 11/322,553, 17 pages. (Ording).
Office Action dated Apr. 6, 2011, received in German Patent Application No. 11 2006 003 309.3, which corresponds to U.S. Appl. No. 11/322,553, 5 pages (Ording).
Office Action dated Apr. 6, 2011, received in German Patent Application No. 11 2006 004 220.3, which corresponds to U.S. Appl. No. 11/322,553, 5 pages (Ording).
Office Action dated May 6, 2011, received in Chinese Patent Application No. 201010516160.3, which corresponds to U.S. Appl. No. 11/322,547, 10 pages (Ording).
Office Action dated Jan. 4, 2011, received in U.S. Appl. No. 11/770,720, 18 pages (Anzures).
Notice of Allowance dated May 20, 2011, received in U.S. Appl. No. 11/770,720, 8 pages (Anzures).
Office Action dated Feb. 17, 2010, received in Australian Patent Application No. 2007292473, which corresponds to U.S. Appl. No. 11/770,720, 1 page (Anzures).
Office Action dated Oct. 25, 2010, received in Chinese Patent Application No. 200780040362.1, which corresponds to U.S. Appl. No. 11/770,720, 18 pages (Anzures).
Office Action dated Jul. 21, 2011, received in Chinese Patent Application No. 200780040362.1, which corresponds to U.S. Appl. No. 11/770,720, 19 pages (Anzures).
Office Action dated Jun. 7, 2010, received in German Patent Application No. 11 2007 002 090.3-53, which corresponds to U.S. Appl. No. 11/770,720, 8 pages (Anzures).
Office Action dated Feb. 24, 2010, received in European Patent Application No. 07 814 635.4-2212, which corresponds to U.S. Appl. No. 11/770,720, 4 pages (Anzures).
Summons to attend oral proceedings dated Nov. 24, 2010 received in European Patent Application No. 07 814 635.4, which corresponds to U.S. Appl. No. 11/770,720, 5 pages (Anzures).
Decision to Grant dated Nov. 4, 2011, received in European Patent Application No. 2 069 895, which corrsspond to U.S. Appl. No. 11/770,720, 1 page (Anzures).
Office Action dated Jun. 6, 2011, received in Japanese Patent Application No. 2009 527504, which corresponds to U.S. Appl. No. 11/770,720, 4 pages (Anzures).
Office Action dated Feb. 15, 2011, received in Korean Patent Application No. 10-2009-7007062, which corresponds to U.S. Appl. No. 11/770,720, 3 pages (Anzures).
Office Action dated May 15, 2009, received in U.S. Appl. No. 11/968,064, 20 pages (Ording).
Final Office dated Jan. 5, 2010, received in U.S. Appl. No. 11/968,064, 20 pages (Ording).
Office Action dated Oct. 5, 2011, received in U.S. Appl. No. 12/240,974, 38 pages (Gehani)
Notice of Allowance dated May 3, 2012, received in U.S. Appl. NO. 12/240,974, 13 pages (Gehani).
Office Action dated Jun. 19, 2012, received in U.S. Appl. No. 12/566,669, 34 pages (Chaudhri).
Office Action dated Sep. 23, 2011, received in U.S. Appl. No. 12/566,638, 20 pages (Ording).
Office Action dated May 7, 2012, received in U.S. Appl. No. 12/566,638, 15 pages (Ording).
Office Action dated Apr. 23, 2012, received in Chinese Patent Application No. 201010292415.2, which corresponds to U.S. Appl. No. 12/567,717, 9 pages (Marr).
Office Action dated May 23, 2012, received in U.S. Appl. No. 12/566,671, 24 pages (Chaudhri).
Aliakseyeu et al., "Multi-flick: An Evaluation of Flick-Based Scrolling Techniques for Pen Interfaces," CHI 2008, Apr. 5-10, 2008, Florence, Italy, 10 pages.

(56) References Cited

OTHER PUBLICATIONS

Apple Computer, Inc., "Slider Programming Topics for Cocoa," Apple Computer, Inc. Oct. 3, 2006, 10 pages.

Haller, B., "Circular Slider 1.3: A reusable Cocoa control," Stick Software, Apr. 2002, http://www.sticksoftware.com/software/CircularSlider.html. 3 pages.

Haller, B., "SSCircularSlider," Stick Software, Aug. 29, 2002, http://www.sticksoftware.com/software/C ircularSlider/doc.html, 13 pages.

Hürst et al., "An Elastic Audio Slider for Interactive Speech Skimming," NordiCHI '04 Proceedings of the third Nordic conference on Human-computer interaction, Oct. 26-27, 2004, Tampere, Finland, 4 pages.

Hürst et al., "Audio-Visual Data Skimming for E-Learning Applications," HCl 2005 Proceedings, vol. 2, Jul. 22-27, 2005, 4 pages.

Hürst et al., "Forward and Backward Speech Skimming with the Elastic Audio Sider," HCI, 2005 Proceedings, Jul. 22-27, 2005, 16 pages.

Hürst et al., "interactive Manipulation of Replay Speed While Listening to Speech Recordings," Multimedia '04 Proceedings of the 12th annual ACM international conference on Multimedia, Oct. 10-16, 2004, New York, New York, 4 pages.

Masul et al., "Elastic Graphical Interfaces for Precise Data Manipulation," ACM Conference on Human Factors in Computing Systems (CHI '95), Apr. 1995, Conference Companion, ACM press, pp. 143-144.

Wikipedia, "Aqua (user interface)," Wikipedia, the free encyclopedia, updated Nov. 18, 2009. http:/en.wikipedia.org/wiki/Aqua_(user_interface), 8 pages.

Office Action dated Mar. 4, 2013, received in Chinese Patent Application No 201010292415.2, which corresponds to U.S. Appl. No. 12/567,717, 12 pages (Marr).

Notice of Allowance dated Apr. 12, 2013, received in U.S. Appl. No. 12/566,671, 11 pages (Chaudhri).

Notice of Allowance dated Jun. 24, 2013, received in U.S. Appl. No. 12/566,672, 11 pages (Chaudhri).

Final Office Action dated Apr. 9, 2013, received in U.S. Appl. No. 12/788,279, 16 pages (Chaudhri).

Office Action dated Jun. 14, 2013, received in Australian Patent Application No. 2010339638, which corresponds to U.S. Appl. No. 12/788,279, 4 pages (Chaudhri).

Office Action dated Mar. 13, 2013, received in U.S. Appl. No. 12,991,705, 16 pages (Ording).

Final Office Action dated Jun. 27, 2013, received in U.S. Appl. No. 12/891,705, 16 pages (Ording).

\* cited by examiner

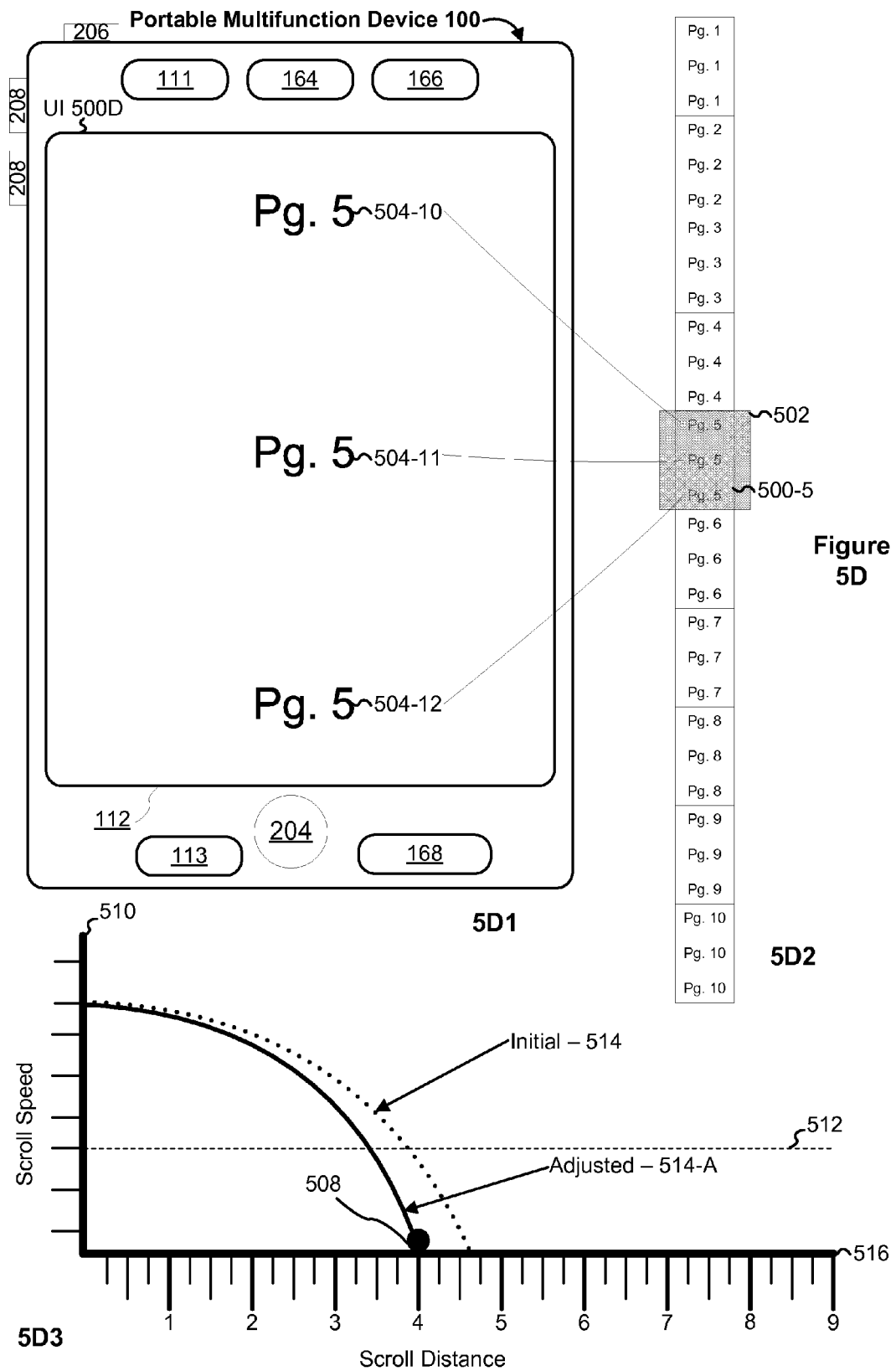

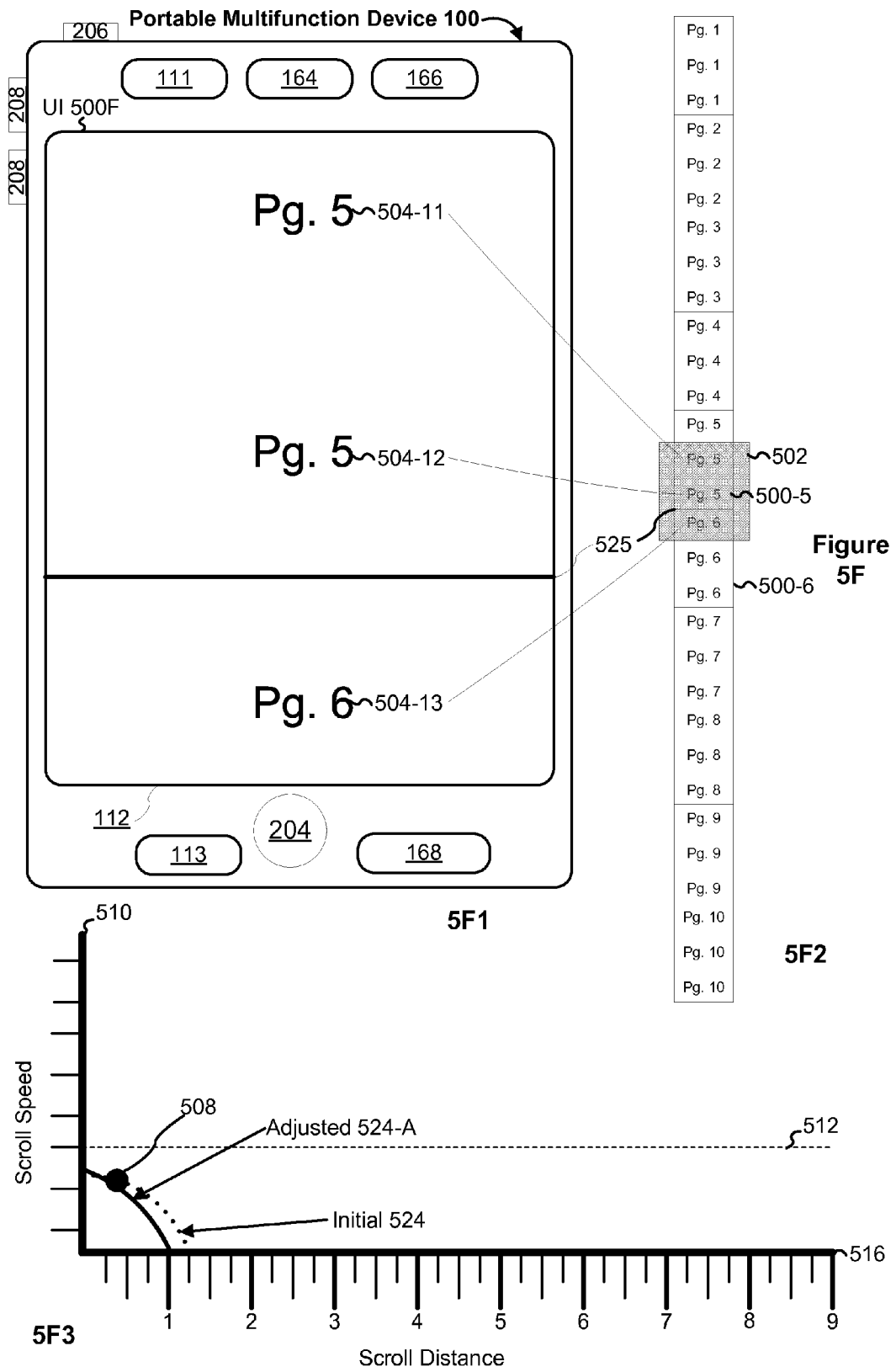

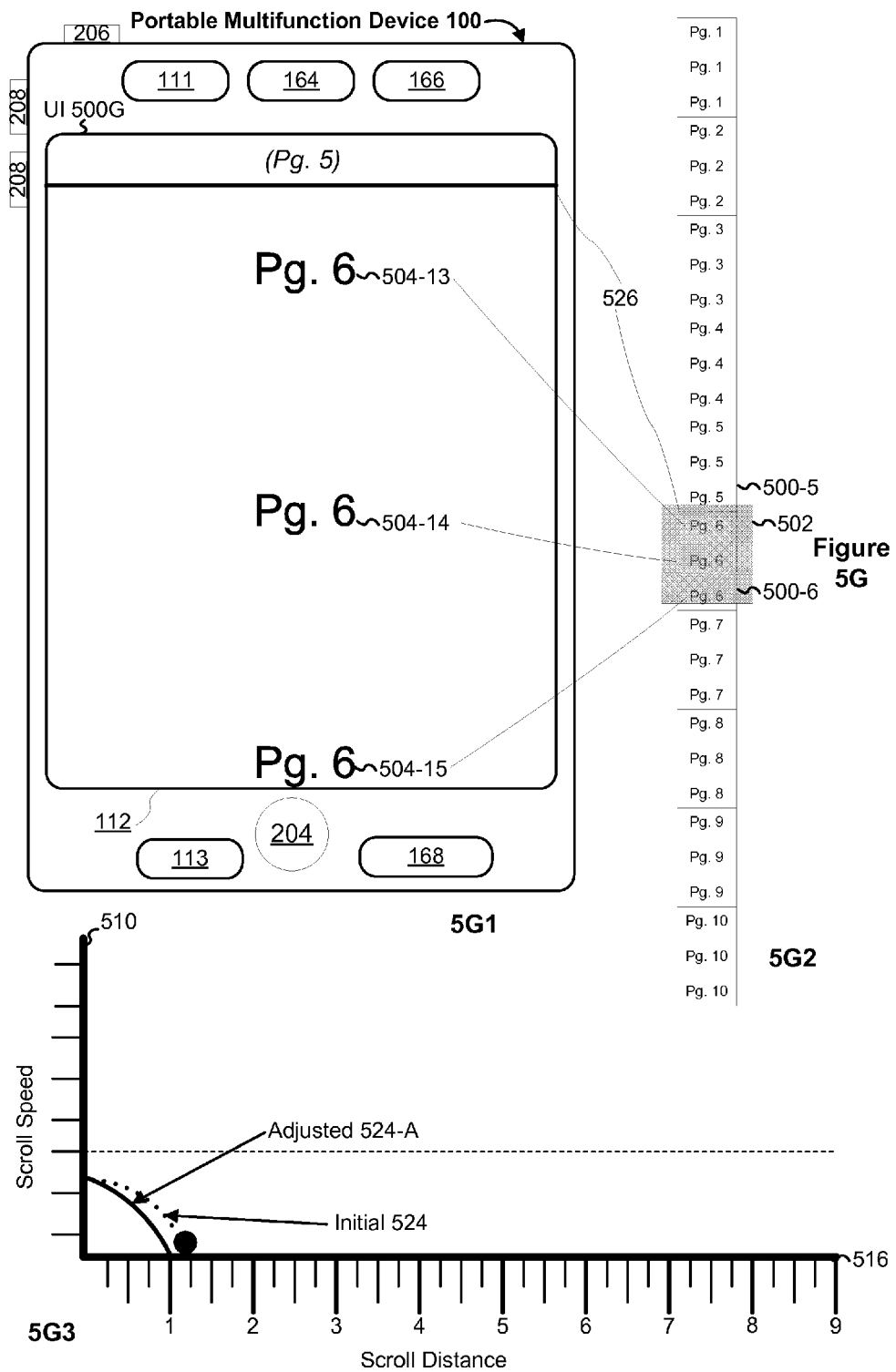

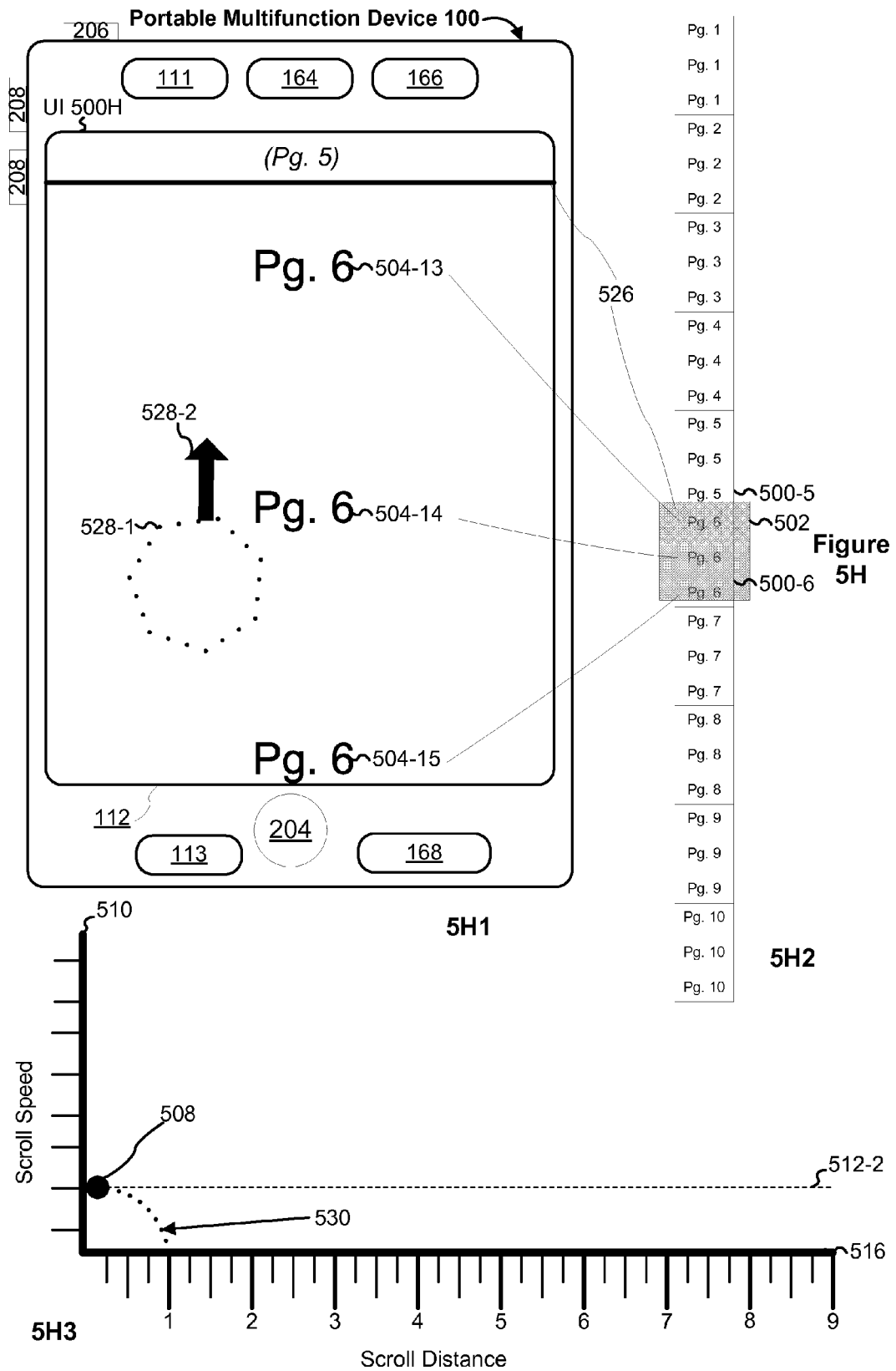

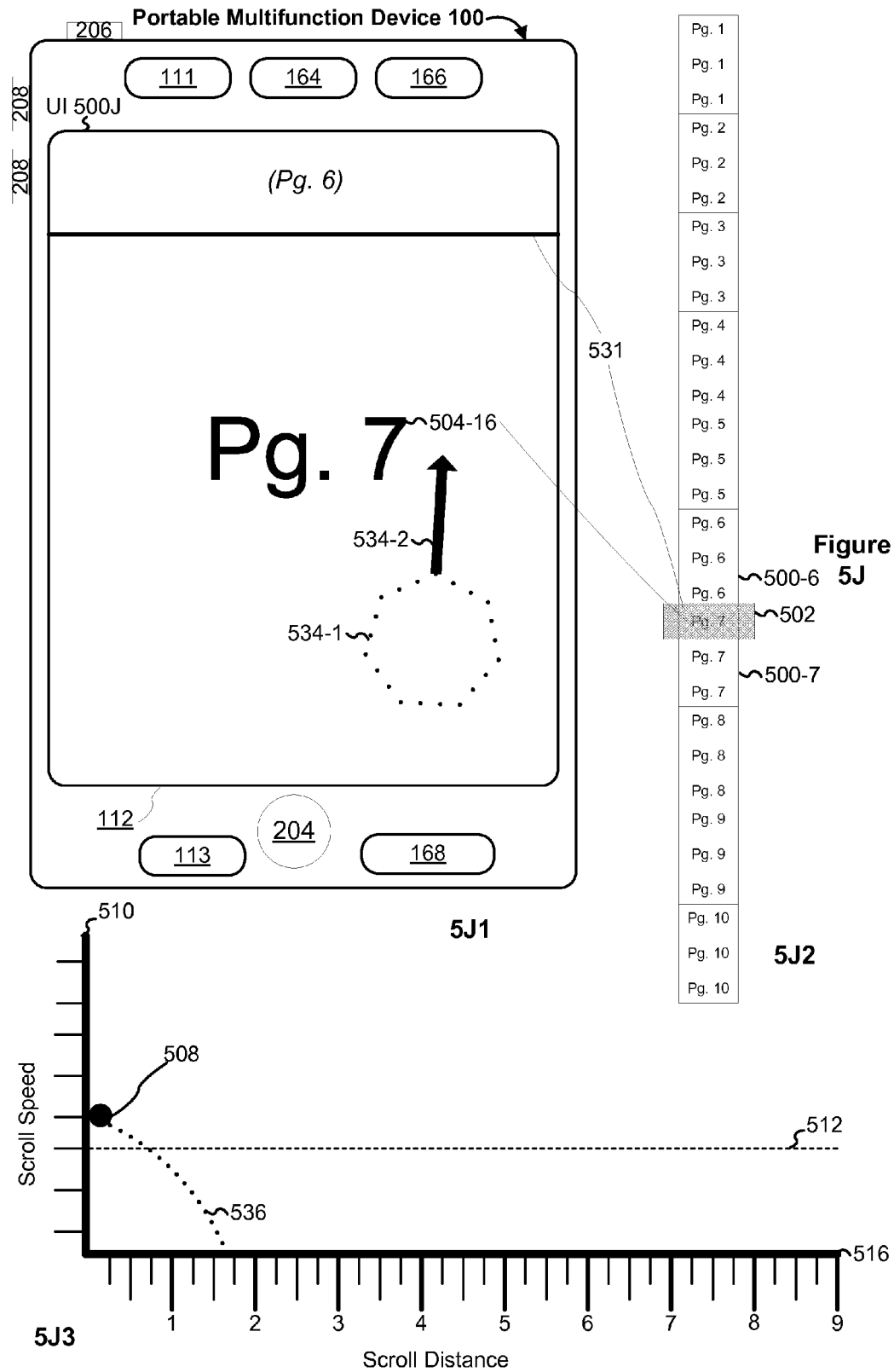

660

| 662 | Display on the display an electronic document that includes a plurality of document sections separated by respective logical structure boundaries. |

| 664 | Detect a gesture on the touch-sensitive surface, wherein an initial contact of the gesture is at a location that corresponds to a first location in the electronic document, the gesture having gesture parameters that include an initial velocity. |

| 666 | When the initial velocity of the gesture exceeds a predefined speed threshold such that the gesture will scroll the electronic document more than one document section: |

| 668 | Initiate scrolling of the electronic document on the display at the initial velocity in accordance with an initial scrolling speed versus scrolling distance function. |

| 670 | While scrolling the electronic document on the display, determine a total scrolling distance based on the initial velocity, wherein the total scrolling distance is adjusted to correspond to a first logical structure boundary in the electronic document. |

| 672 | Adjustment of the total scrolling distance is performed substantially at the time of detecting liftoff of the gesture from the touch-sensitive surface. |

| 674 | Scroll the electronic document for the total scrolling distance. |

Figure 6D

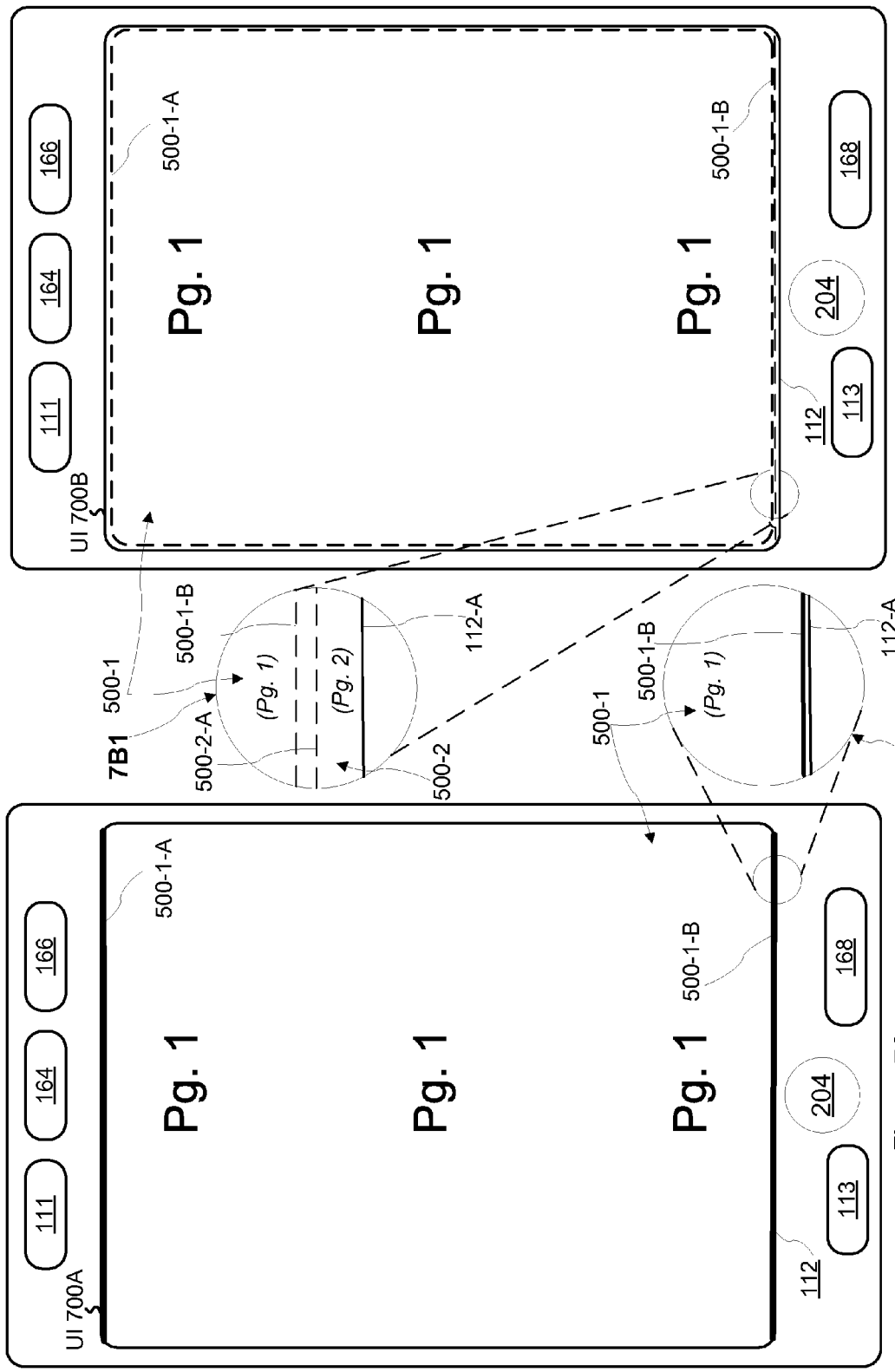

DEVICE, METHOD, AND GRAPHICAL USER INTERFACE FOR SCROLLING A MULTI-SECTION DOCUMENT

TECHNICAL FIELD

The disclosed embodiments relate generally to electronic devices with touch-sensitive surfaces, and more particularly, to methods and electronic devices with touch-sensitive surfaces for scrolling multi-section electronic documents in accordance with heuristics for improved electronic document display.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Many users rely on electronic computing devices with touch-sensitive surfaces and displays for viewing and manipulating multi-section electronic documents. In these circumstances, users may navigate through an electronic document on the display with gestures on the device's touch-sensitive surface or touch screen. Unfortunately, existing methods for scrolling multi-section documents are cumbersome and inefficient, and often do not result in the display of electronic documents according to a user's desires. In addition, existing methods of scrolling through documents take longer than necessary, thereby wasting energy. This latter consideration is particularly important in battery-operated devices.

Accordingly, there is a need for computing devices with faster, more efficient methods and interfaces for scrolling multi-section documents in accordance with heuristics that improve electronic document display. Such methods and interfaces may complement or replace conventional methods for scrolling multi-section documents. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display, and a touch-sensitive surface. The method includes: displaying on the display an electronic document that includes a plurality of document sections separated by respective logical structure boundaries; detecting a gesture on the touch-sensitive surface, wherein an initial contact of the gesture is at a location that corresponds to a first location in the electronic document, the gesture having gesture parameters that include an initial velocity; and when the initial velocity of the gesture exceeds a predefined speed threshold such that the gesture will scroll the electronic document more than one document section: initiating scrolling of the electronic document on the display at the initial velocity in accordance with an initial scrolling speed versus scrolling distance function; while scrolling the electronic document on the display, adjusting the scrolling speed versus scrolling distance function so that when the scrolling speed becomes zero, a first logical structure boundary in the electronic document is displayed at a predefined location on the display; and, scrolling the electronic document in accordance with the adjusted scrolling speed versus scrolling distance function.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying on the display an electronic document that includes a plurality of document sections separated by respective logical structure boundaries; detecting a gesture on the touch-sensitive surface, wherein an initial contact of the gesture is at a location that corresponds to a first location in the electronic document, the gesture having gesture parameters that include an initial velocity; and when the initial velocity of the gesture exceeds a predefined speed threshold such that the gesture will scroll the electronic document more than one document section: initiating scrolling of the electronic document on the display at the initial velocity in accordance with an initial scrolling speed versus scrolling distance function; while scrolling the electronic document on the display, adjusting the scrolling speed versus scrolling distance function so that when the scrolling speed becomes zero, a first logical structure boundary in the electronic document is displayed at a predefined location on the display; and, scrolling the electronic document in accordance with the adjusted scrolling speed versus scrolling distance function.

In accordance with some embodiments, a computer readable storage medium has stored therein instructions which when executed by a multifunction device with a display and a touch-sensitive surface, cause the device to: display on the display an electronic document that includes a plurality of document sections separated by respective logical structure boundaries; detect a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: initiate scrolling of the electronic document on the display at the initial velocity in accordance with an initial scrolling speed versus scrolling distance function; while scrolling the electronic document on the display, adjust the scrolling speed versus scrolling distance function so that when the scrolling speed becomes zero, a first logical structure boundary in the electronic document is displayed at a predefined location on the display; and, scroll the electronic document in accordance with the adjusted scrolling speed versus scrolling distance function.

In accordance with some embodiments, a graphical user interface is displayed on a multifunction device with a display, a touch-sensitive surface, a memory, and one or more processors to execute one or more programs stored in the memory. The graphical user interface includes an electronic document displayed on the display, which includes a plurality of document sections separated by respective logical structure boundaries, wherein: a gesture is detected on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: scrolling of the electronic document is initiated on the display at the initial velocity in accordance with an initial scrolling speed versus scrolling distance function; while scrolling the electronic document on the display, the scrolling speed versus scrolling distance function is adjusted so that when the scrolling speed becomes zero, a first logical structure boundary in the electronic document is displayed at a predefined location on the display; and, the electronic document is scrolled in accordance with the adjusted scrolling speed versus scrolling distance function.

In accordance with some embodiments, a multifunction device includes: a display; a touch-sensitive surface; and means for displaying on the display an electronic document that includes a plurality of document sections separated by respective logical structure boundaries; means for detecting a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: means for initiating scrolling of the electronic document on the display at the initial velocity in accordance with an initial scrolling speed versus scrolling distance function; while scrolling the electronic document on the display, means for adjusting the scrolling speed versus scrolling distance function so that when the scrolling speed becomes zero, a first logical structure boundary in the electronic document is displayed at a predefined location on the display; and, means for scrolling the electronic document in accordance with the adjusted scrolling speed versus scrolling distance function.

In accordance with some embodiments, an information processing apparatus for use in a multifunction device with a display and a touch-sensitive surface includes: means for displaying on the display an electronic document that includes a plurality of document sections separated by respective logical structure boundaries; means for detecting a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: means for initiating scrolling of the electronic document on the display at the initial velocity in accordance with an initial scrolling speed versus scrolling distance function; while scrolling the electronic document on the display, means for adjusting the scrolling speed versus scrolling distance function so that when the scrolling speed becomes zero, a first logical structure boundary in the electronic document is displayed at a predefined location on the display; and, means for scrolling the electronic document in accordance with the adjusted scrolling speed versus scrolling distance function.

In accordance with some embodiments, a method is performed at a multifunction device with a display and a touch-sensitive surface. The method includes: displaying on the display an electronic document that includes a plurality of document sections separated by respective logical structure boundaries; detecting a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: initiating scrolling of the electronic document on the display at the initial velocity in accordance with an initial scrolling speed versus scrolling distance function; while scrolling the electronic document on the display, determining a total scrolling distance based on the initial velocity, wherein the total scrolling distance is adjusted to correspond to a first logical structure boundary in the electronic document; and, scrolling the electronic document for the total scrolling distance.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying on the display an electronic document that includes a plurality of document sections separated by respective logical structure boundaries; detecting a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: initiating scrolling of the electronic document on the display at the initial velocity in accordance with an initial scrolling speed versus scrolling distance function; while scrolling the electronic document on the display, determining a total scrolling distance based on the initial velocity, wherein the total scrolling distance is adjusted to correspond to a first logical structure boundary in the electronic document; and, scrolling the electronic document for the total scrolling distance.

In accordance with some embodiments, a computer readable storage medium has stored therein instructions which when executed by a multifunction device with a display and a touch-sensitive surface, cause the device to: display on the display an electronic document that includes a plurality of document sections separated by respective logical structure boundaries; detect a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: initiate scrolling of the electronic document on the display at the initial velocity in accordance with an initial scrolling speed versus scrolling distance function; while scrolling the electronic document on the display, determine a total scrolling distance based on the initial velocity, wherein the total scrolling distance is adjusted to correspond to a first logical structure boundary in the electronic document; and, scroll the electronic document for the total scrolling distance.

In accordance with some embodiments, a graphical user interface is displayed on a multifunction device with a display, a touch-sensitive surface, a memory, and one or more processors to execute one or more programs stored in the memory. The graphical user interface includes an electronic document displayed on the display, which includes a plurality of document sections separated by respective logical structure boundaries, wherein: a gesture is detected on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: scrolling of the electronic document on the display is initiated at the initial velocity in accordance with an initial scrolling speed versus scrolling distance function; while scrolling the electronic document on the display, a total scrolling distance based on the initial velocity is determined, wherein the total scrolling distance is adjusted to correspond to a first logical structure boundary in the electronic document; and, the electronic document is scrolled for the total scrolling distance.

In accordance with some embodiments, a multifunction device includes: a display; a touch-sensitive surface; means for displaying on the display an electronic document that includes a plurality of document sections separated by respective logical structure boundaries; means for detecting a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: means for initiating scrolling of the electronic document on the display at the initial velocity in accordance with an initial scrolling speed versus scrolling distance function; while scrolling the electronic document on the display, means for determining a total scrolling distance based on the initial velocity, wherein the total scrolling distance is adjusted to correspond to a first logical structure boundary in the electronic document; and, means for scrolling the electronic document for the total scrolling distance.

In accordance with some embodiments, an information processing apparatus for use in a multifunction device with a display and a touch-sensitive surface includes: means for displaying on the display an electronic document that includes a plurality of document sections separated by respective logical structure boundaries; means for detecting a gesture on the touch-sensitive surface, wherein an initial contact of the gesture is at a location that corresponds to a first location in the electronic document, the gesture having gesture parameters that include an initial velocity; when the initial velocity of the gesture exceeds a predefined speed threshold such that the gesture will scroll the electronic document more than one document section: means for initiating scrolling of the electronic document on the display at the initial velocity in accordance with an initial scrolling speed versus scrolling distance function; while scrolling the electronic document on the display, means for determining a total scrolling distance based on the initial velocity, wherein the total scrolling distance is adjusted to correspond to a first logical structure boundary in the electronic document; and, means for scrolling the electronic document for the total scrolling distance.

In accordance with some embodiments, a method is performed at a multifunction device with a display, and a touch-sensitive surface. The method includes: displaying an electronic document that includes a plurality of document sections separated by respective logical structure boundaries; detecting a gesture on the touch-sensitive surface, the detected gesture corresponding to a scroll of the electronic document having a scrolling distance that is more than one document section; in response to detecting the gesture: initiating scrolling of the electronic document on the display; while scrolling the electronic document on the display, adjusting the scrolling distance so that when the scrolling stops, a first logical structure boundary in the electronic document will be at a predefined location on the display; and, scrolling the electronic document in accordance with the adjusted scrolling distance.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying an electronic document that includes a plurality of document sections separated by respective logical structure boundaries; detecting a gesture on the touch-sensitive surface, the detected gesture corresponding to a scroll of the electronic document having a scrolling distance that is more than one document section; in response to detecting the gesture: initiating scrolling of the electronic document on the display; while scrolling the electronic document on the display, adjusting the scrolling distance so that when the scrolling stops, a first logical structure boundary in the electronic document will be at a predefined location on the display; and, scrolling the electronic document in accordance with the adjusted scrolling distance.

In accordance with some embodiments, a computer readable storage medium has stored therein instructions which when executed by a multifunction device with a display and a touch-sensitive surface, cause the device to: display an electronic document that includes a plurality of document sections separated by respective logical structure boundaries; detect a gesture on the touch-sensitive surface, the detected gesture corresponding to a scroll of the electronic document having a scrolling distance that is more than one document section; in response to detecting the gesture: initiate scrolling of the electronic document on the display; while scrolling the electronic document on the display, adjust the scrolling distance so that when the scrolling stops, a first logical structure boundary in the electronic document will be at a predefined location on the display; and, scroll the electronic document in accordance with the adjusted scrolling distance.

In accordance with some embodiments, a graphical user interface is displayed on a multifunction device with a display, a touch-sensitive surface, a memory, and one or more processors to execute one or more programs stored in the memory. The graphical user interface includes an electronic document displayed on the display, which includes a plurality of document sections separated by respective logical structure boundaries, wherein: an electronic document is displayed that includes a plurality of document sections separated by respective logical structure boundaries; a gesture is detected on the touch-sensitive surface, the detected gesture corresponding to a scroll of the electronic document having a scrolling distance that is more than one document section; in response to detecting the gesture: scrolling of the electronic document is initiated on the display; while scrolling the electronic document on the display, the scrolling distance is adjusted so that when the scrolling stops, a first logical structure boundary in the electronic document will be at a predefined location on the display; and, the electronic document is scrolled in accordance with the adjusted scrolling distance.

In accordance with some embodiments, a multifunction device includes: a display; a touch-sensitive surface; and means for displaying on the display an electronic document that includes a plurality of document sections separated by respective logical structure boundaries; means for displaying an electronic document that includes a plurality of document sections separated by respective logical structure boundaries; means for detecting a gesture on the touch-sensitive surface, the detected gesture corresponding to a scroll of the electronic document having a scrolling distance that is more than one document section; in response to detecting the gesture: means for initiating scrolling of the electronic document on the display; while scrolling the electronic document on the display, means for adjusting the scrolling distance so that when the scrolling stops, a first logical structure boundary in the electronic document will be at a predefined location on the display; and, means for scrolling the electronic document in accordance with the adjusted scrolling distance.

In accordance with some embodiments, an information processing apparatus for use in a multifunction device with a display and a touch-sensitive surface includes: means for displaying on the display an electronic document that includes a plurality of document sections separated by respective logical structure boundaries; means for displaying an electronic document that includes a plurality of document sections separated by respective logical structure boundaries; means for detecting a gesture on the touch-sensitive surface, the detected gesture corresponding to a scroll of the electronic document having a scrolling distance that is more than one document section; in response to detecting the gesture: means for initiating scrolling of the electronic document on the display; while scrolling the electronic document on the display, means for adjusting the scrolling distance so that when the scrolling stops, a first logical structure boundary in the electronic document will be at a predefined location on the display; and, means for scrolling the electronic document in accordance with the adjusted scrolling distance.

Thus, multifunction devices with displays and touch-sensitive surfaces are provided with faster, more efficient methods and interfaces for scrolling multi-section documents in accordance with heuristics that improve electronic document display, thereby increasing the effectiveness, efficiency, and user satisfaction with such devices. Such methods and interfaces may complement or replace conventional methods for scrolling multi-section documents.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 6D is a flow diagram illustrating a method of scrolling multi-section documents in accordance with heuristics for improved electronic document display in accordance with some embodiments.

FIGS. 7A-7B illustrate exemplary user interfaces for displaying multi-section documents in accordance with some embodiments.

DESCRIPTION OF EMBODIMENTS

Figure 1A:
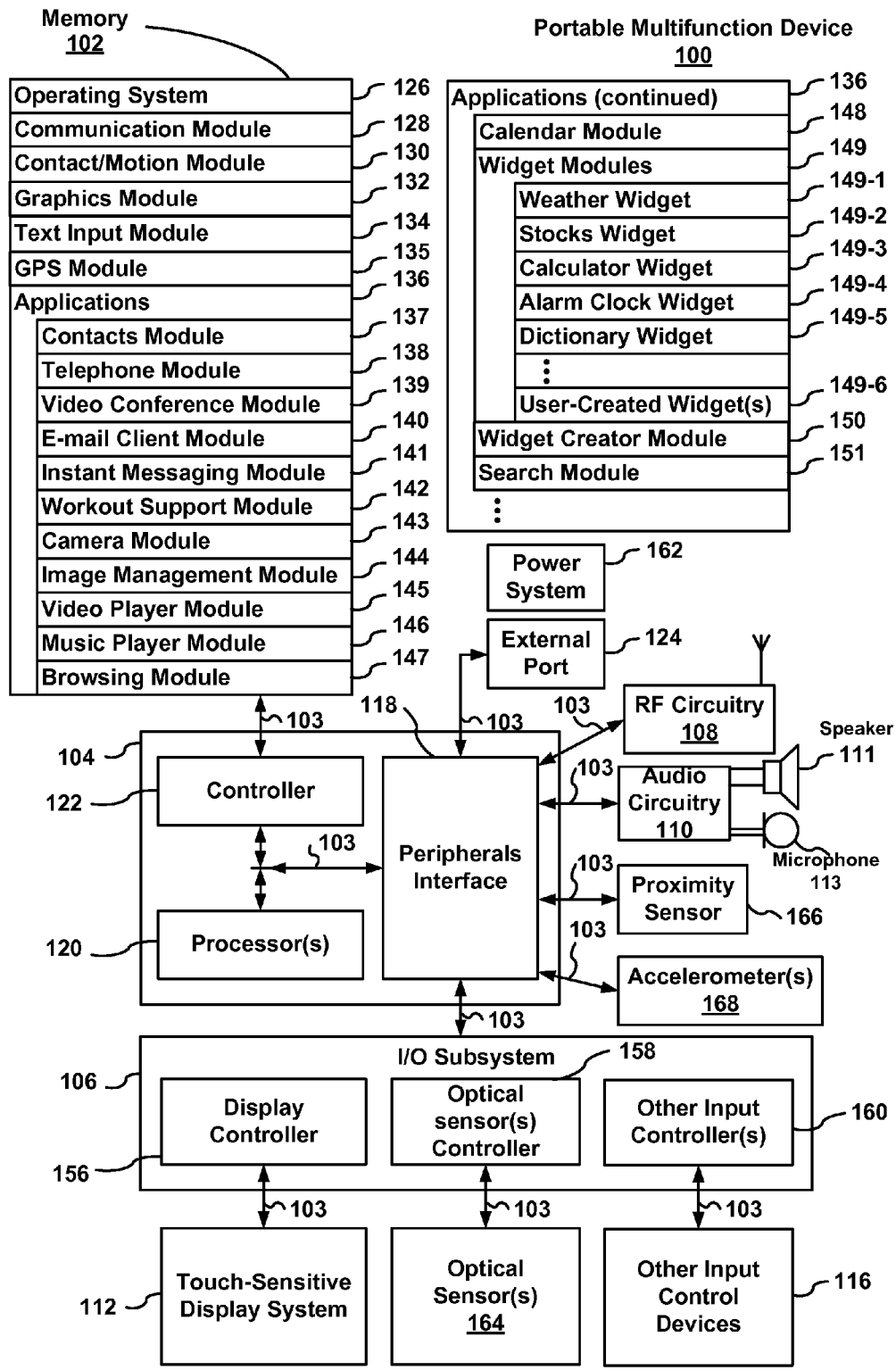
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, California. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
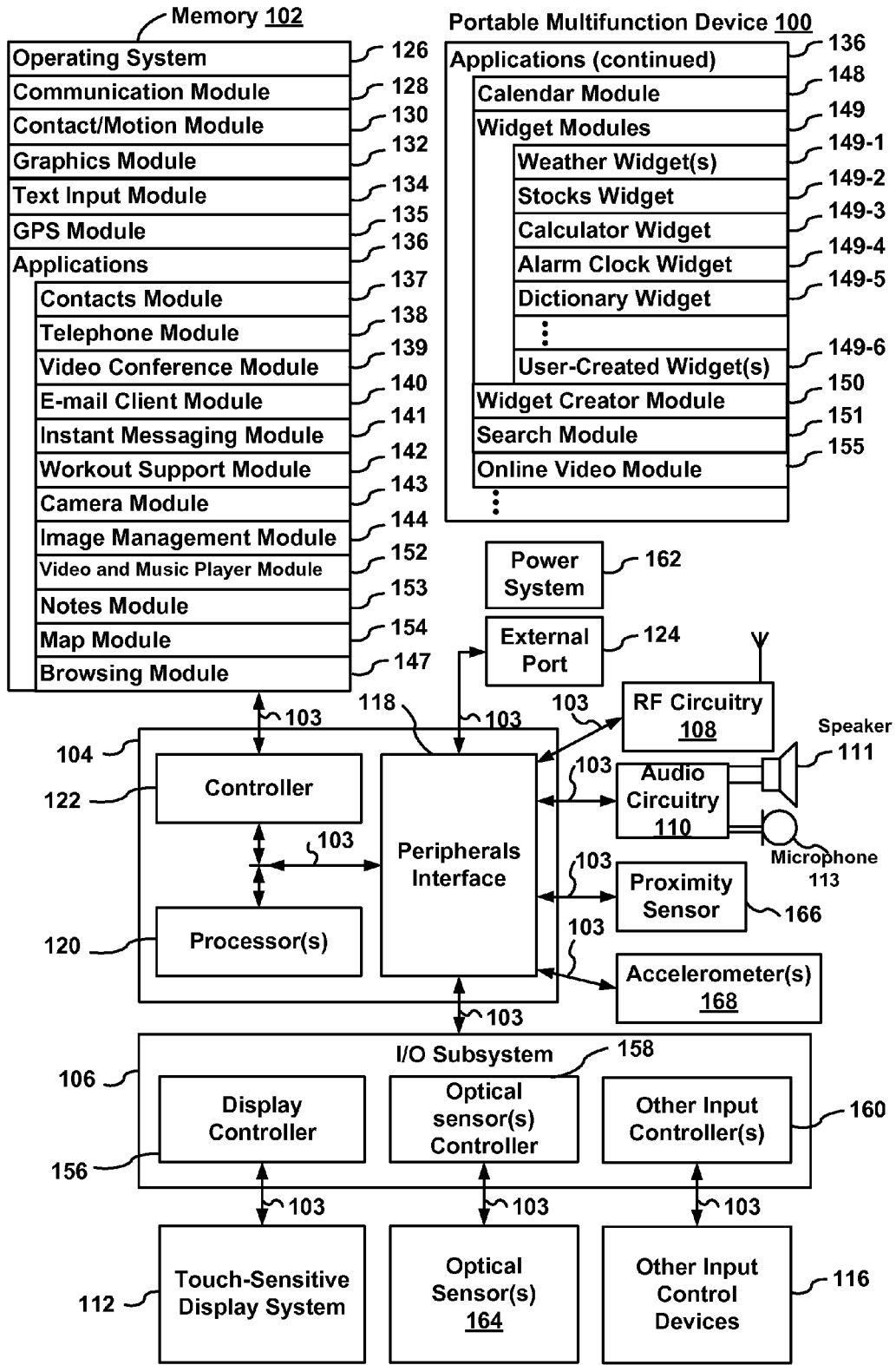

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g., 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Inc. of Cupertino, California.

A touch-sensitive display in some embodiments of the touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event. In some embodiments, the contact/motion module 130 differentiates between multiple distinct types of finger swipe gestures.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a workout support module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
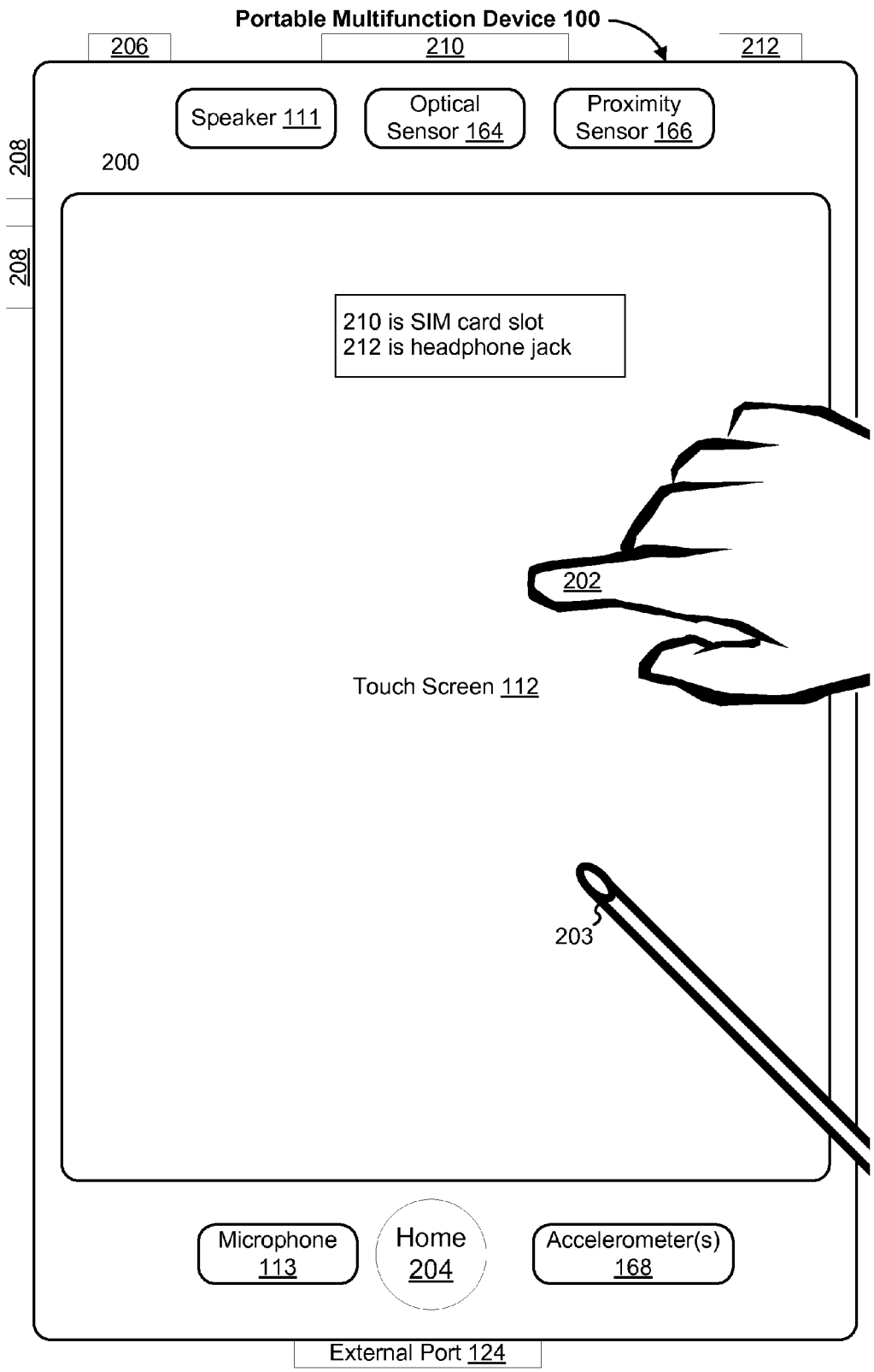
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
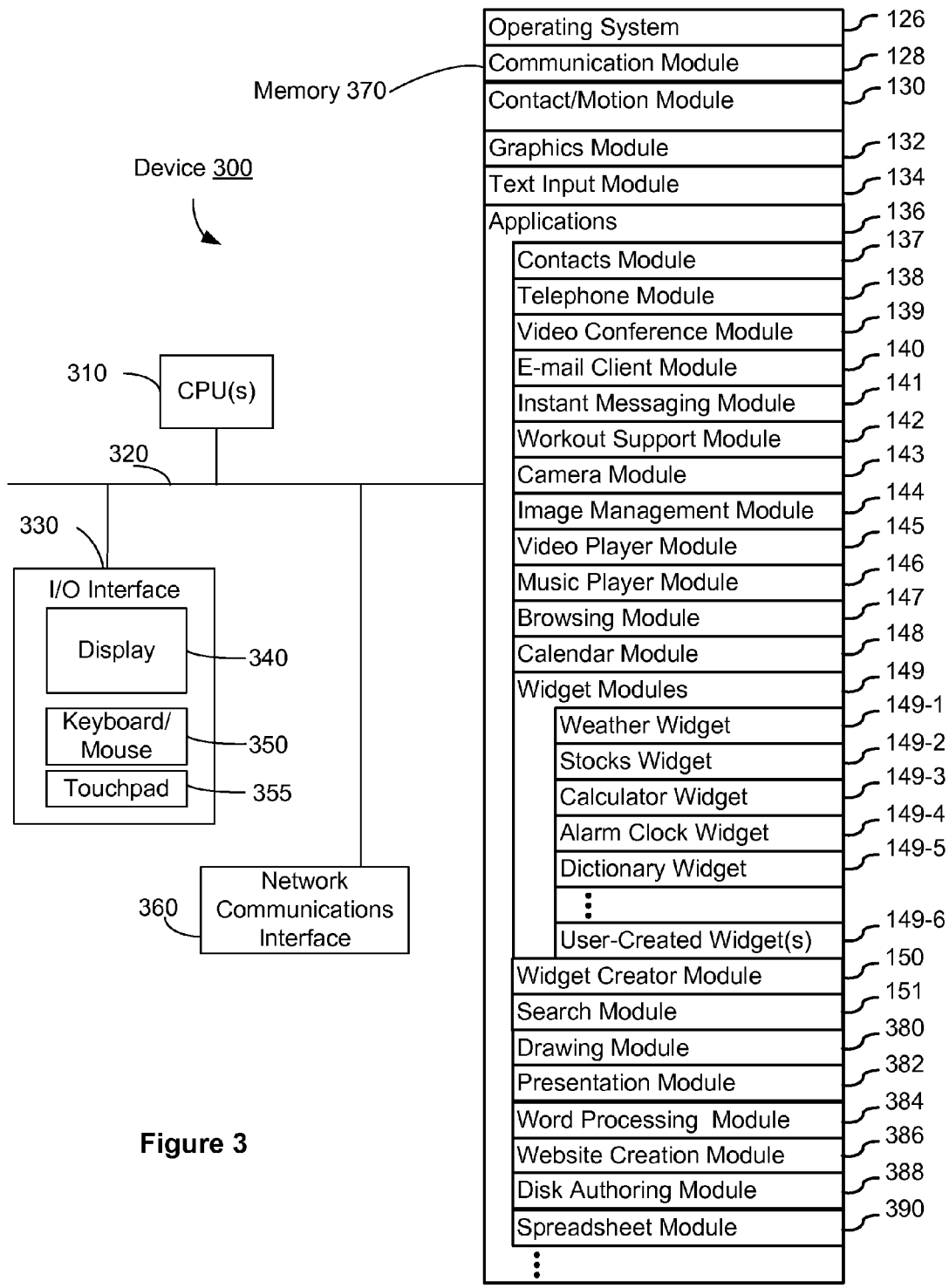
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which is typically a touch screen display. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
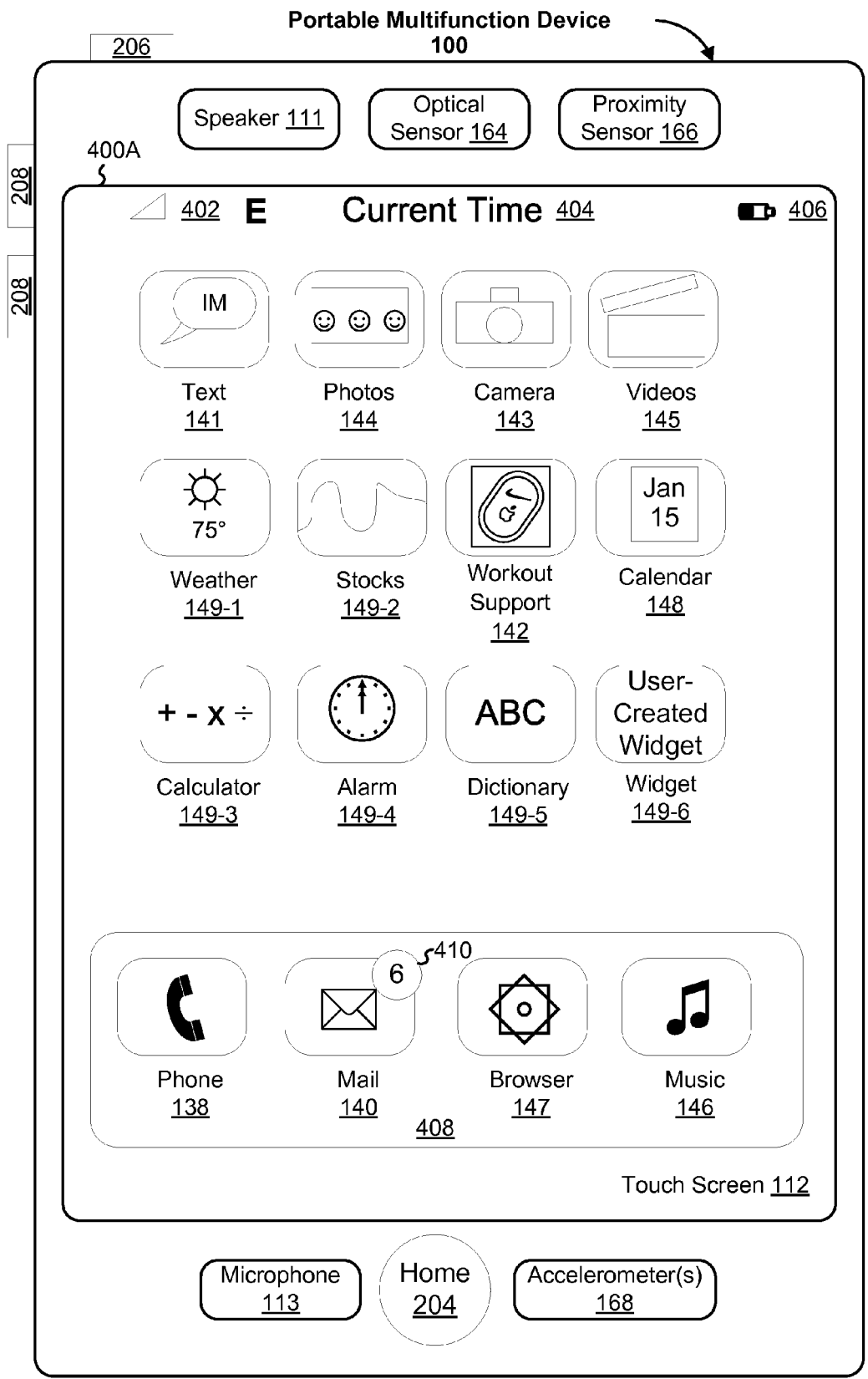
FIGS. 4A and 4B illustrate exemplary user interfaces for a menu of applications on a portable multifunction device in accordance with some embodiments.
Figure 4B:
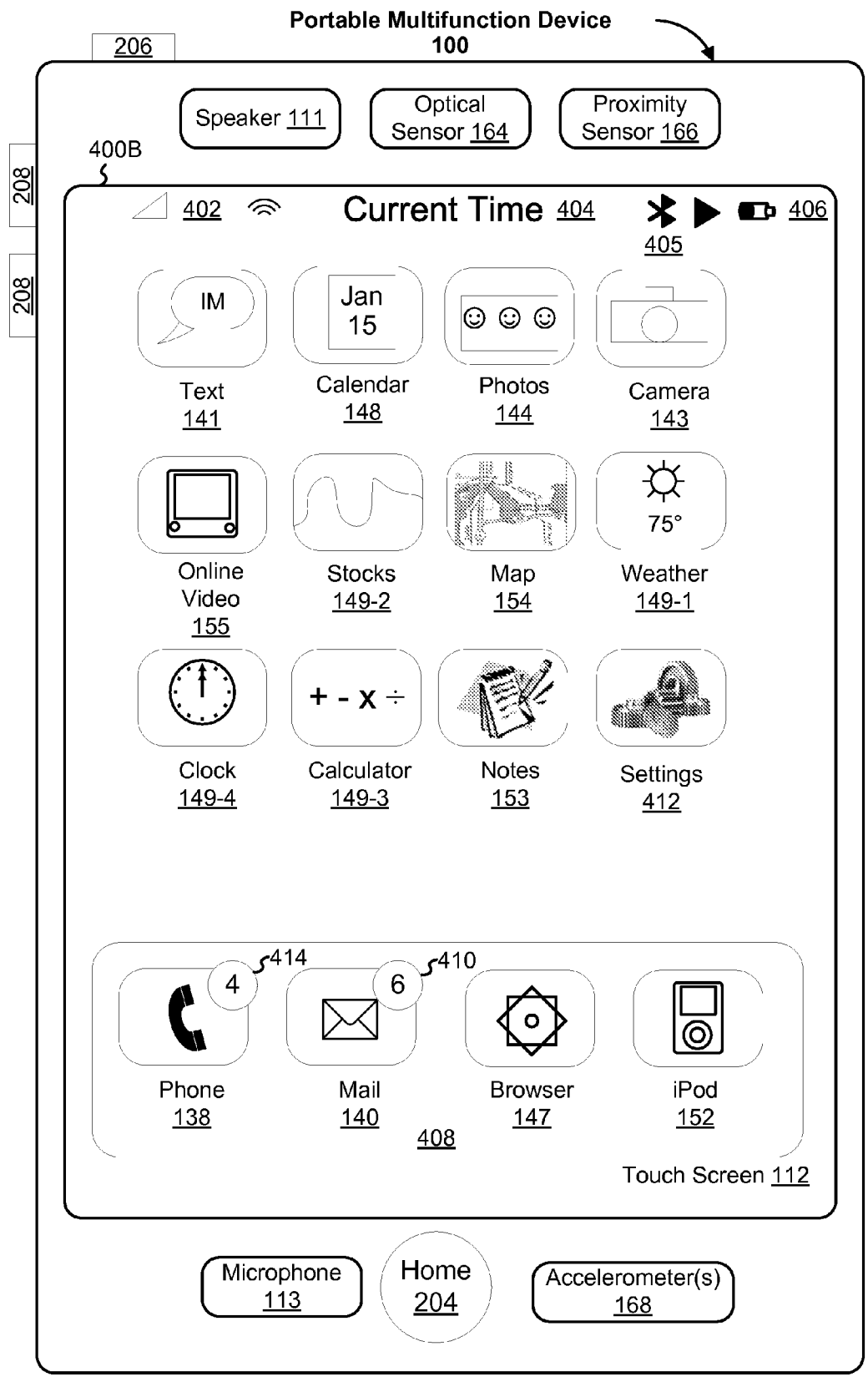

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
- Phone 138, which may include an indicator 414 of the number of missed calls or voicemail messages;
- E-mail client 140, which may include an indicator 410 of the number of unread e-mails;
- Browser 147; and
- Music player 146; and Icons for other applications, such as:
- IM 141;
- Image management 144;
- Camera 143;
- Video player 145;
- Weather 149-1;
- Stocks 149-2;
- Workout support 142;
- Calendar 148;
- Calculator 149-3;
- Alarm clock 149-4;
- Dictionary 149-5; and
- User-created widget 149-6.

In some embodiments, user interface 400B includes the following elements, or a subset or superset thereof:
- 402, 404, 405, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple Inc.) module 152; and
- Online video module 155, also referred to as YouTube (trademark of Google Inc.) module 155.

Figure 4C:
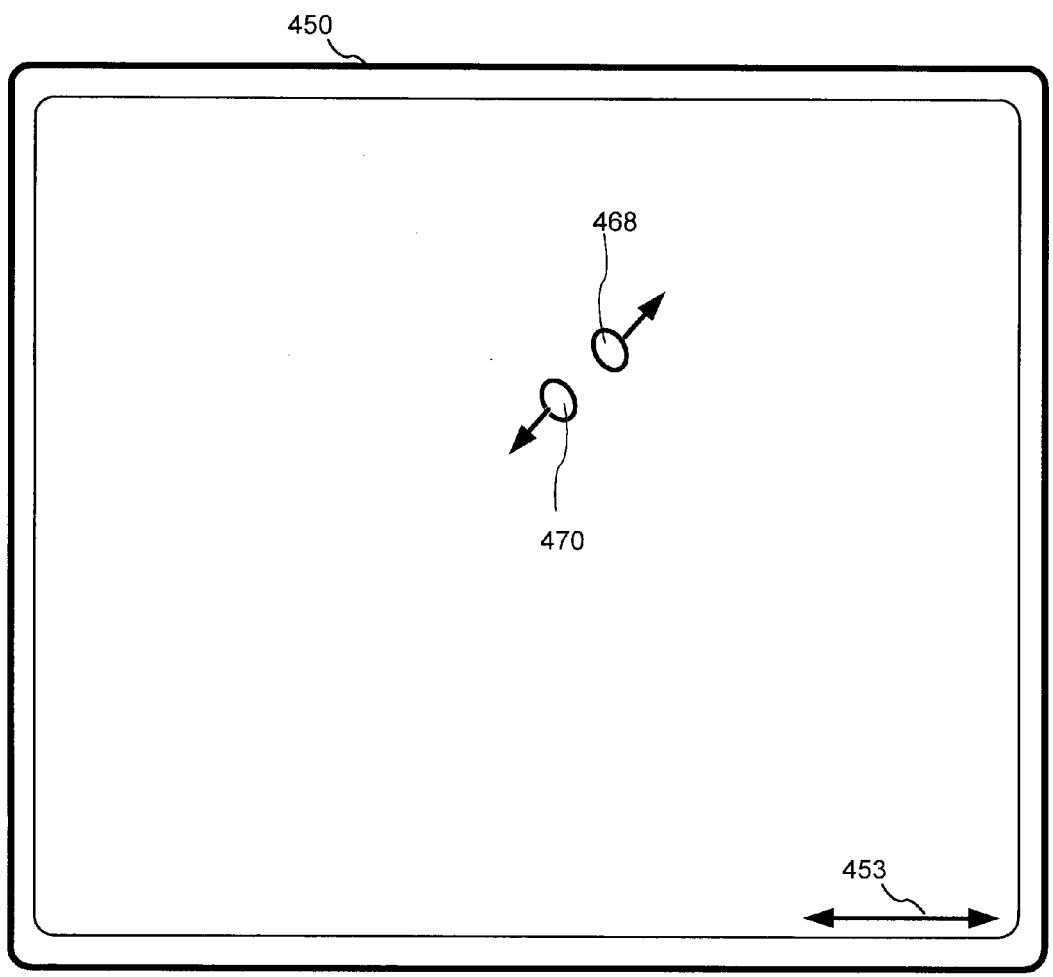
FIG. 4C illustrates an exemplary user interface for a multifunction device with a touch-sensitive surface that is separate from the display in accordance with some embodiments.
Figure 4C:
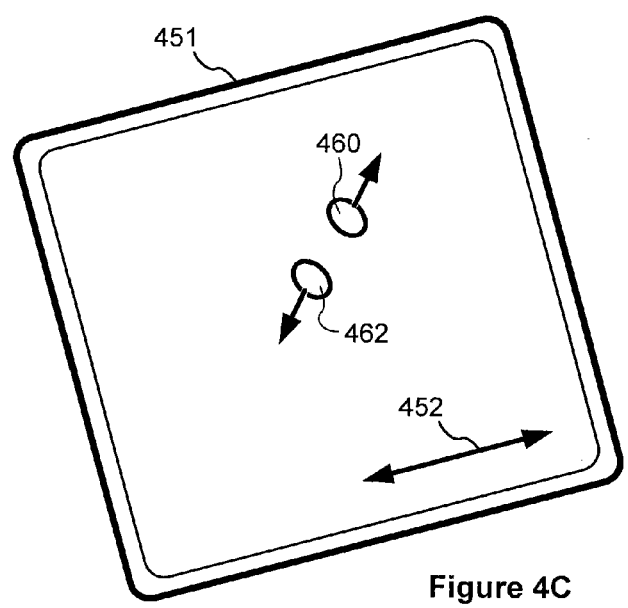

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

It would be desirable for users to be able to use a single navigational gesture to move through multiple sections of an electronic document, especially when the document is a large, multi-section electronic document. Existing methods for scrolling multi-section documents are cumbersome and inefficient, and often do not result in the display of electronic documents according to a user's desires. For example, scrolling an electronic document over several sections or pages in response to one or more swipe (or other) gestures may result in the electronic document displayed with a page break in the middle of the screen. This is tedious and imposes a cognitive burden on the user, who must then adjust the electronic document with an additional gesture. In addition, existing methods of scrolling documents take longer than necessary, thereby wasting energy. This latter consideration is particularly important in battery-operated devices.

Figure 5A:
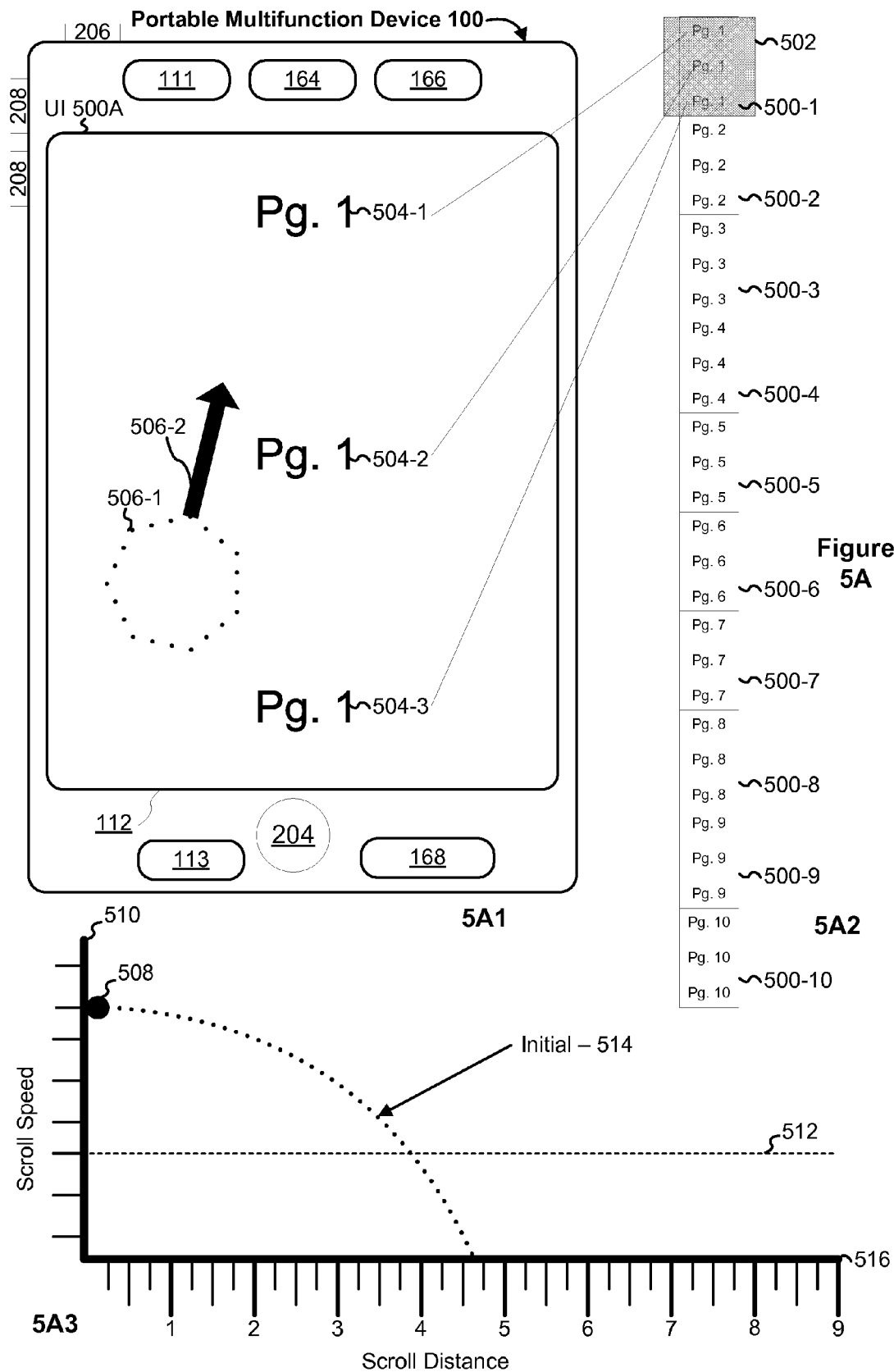
FIGS. 5A-5O illustrate exemplary user interfaces for scrolling multi-section documents in accordance with heuristics for improved electronic document display in accordance with some embodiments.
Figure 5B:
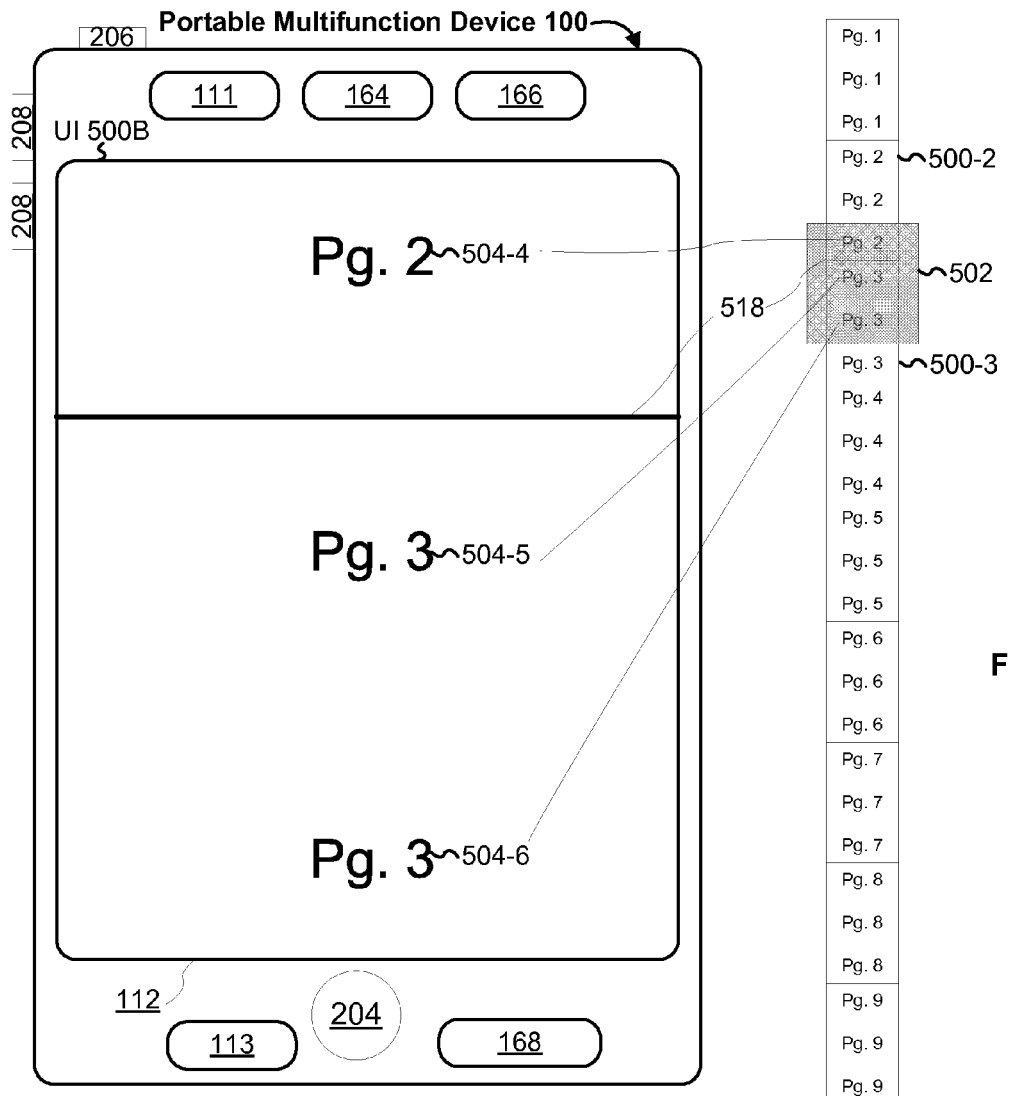
Figure 5B:
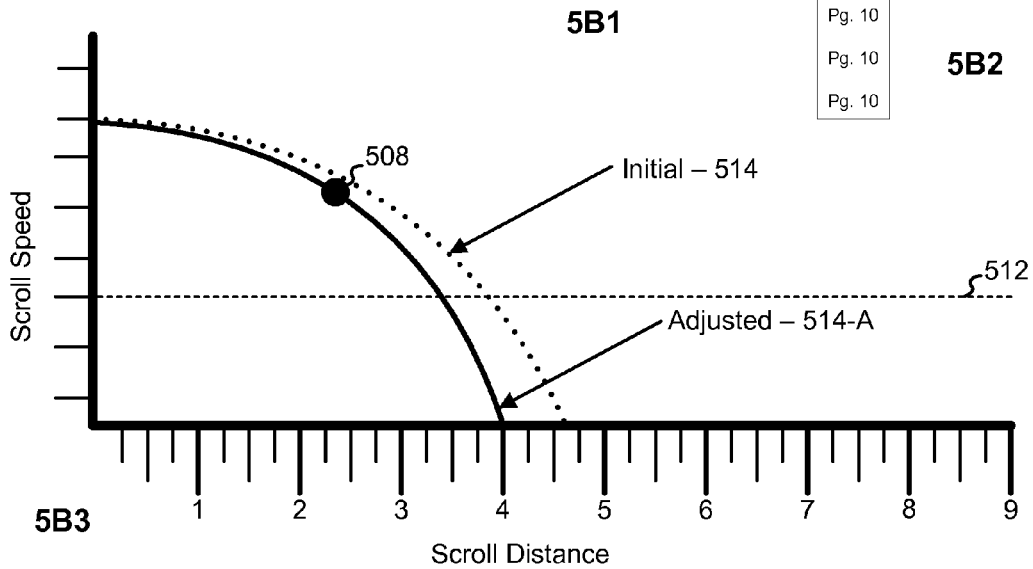
Figure 5C:
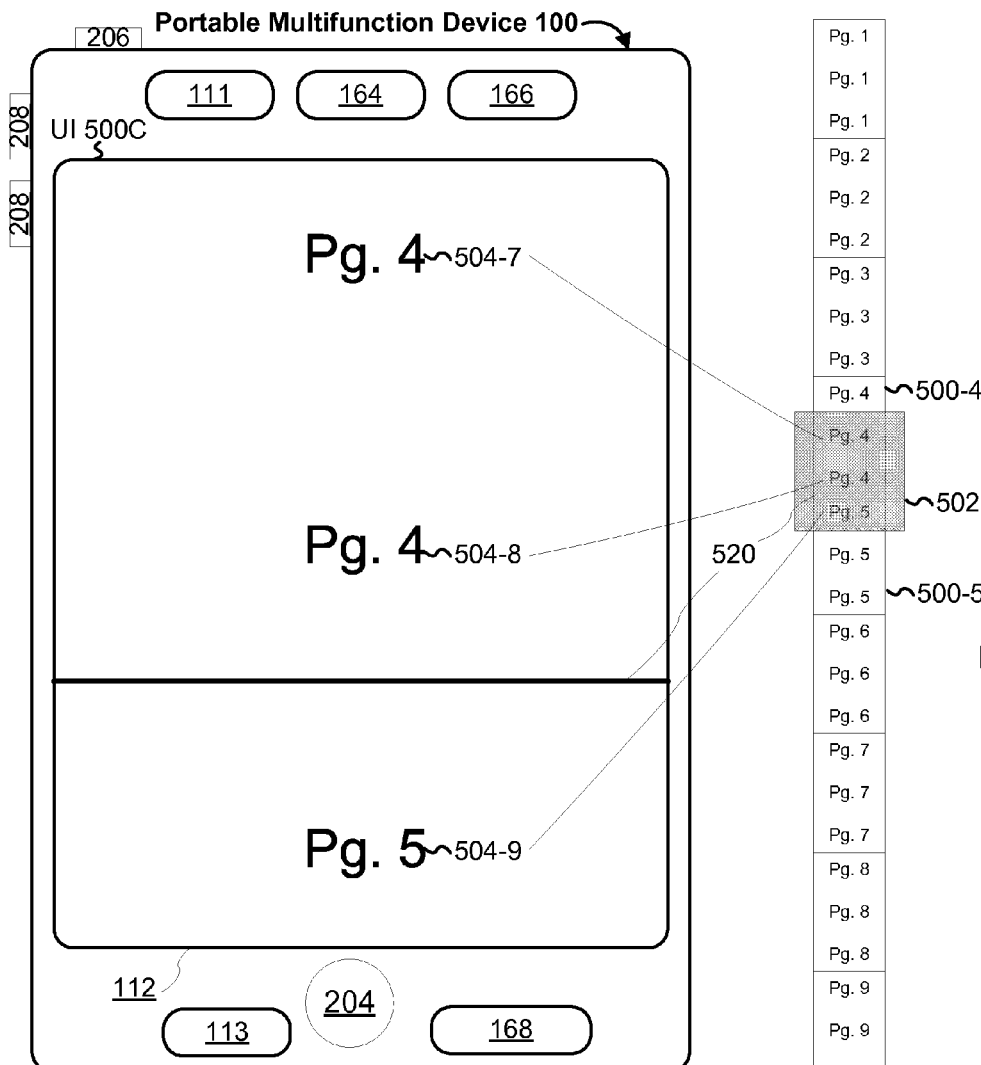
Figure 5C:
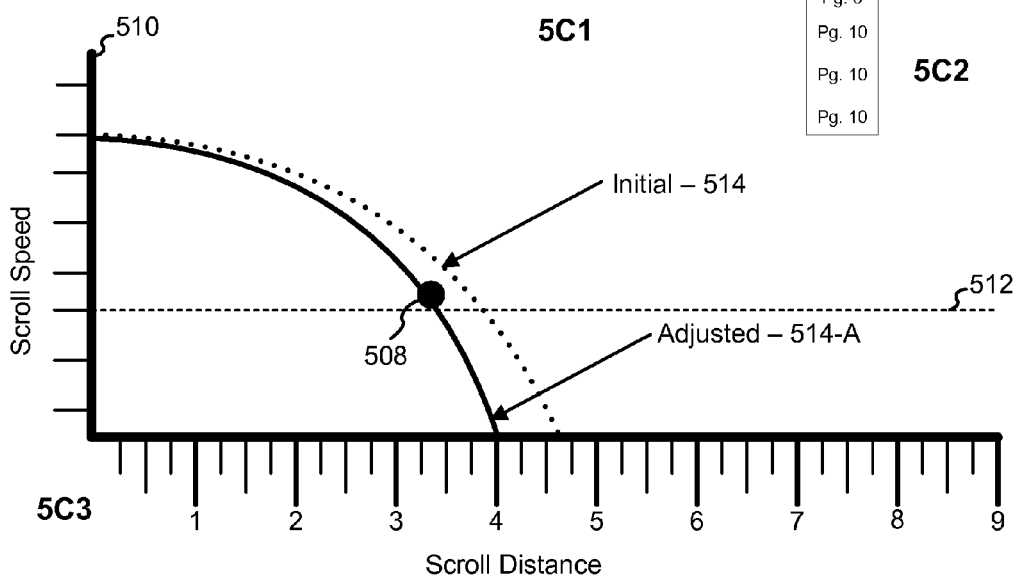
Figure 5E:
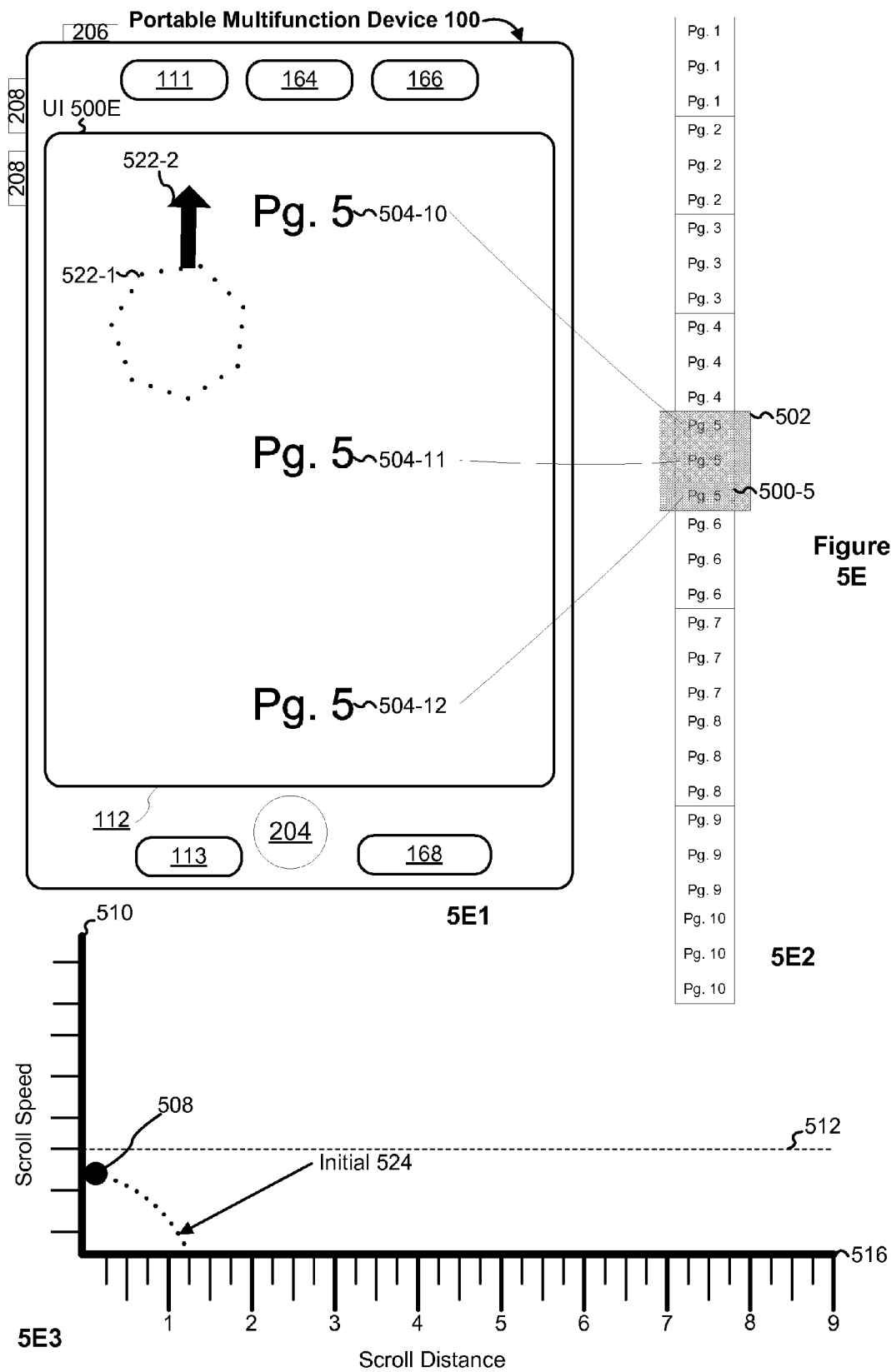
Figure 5I:
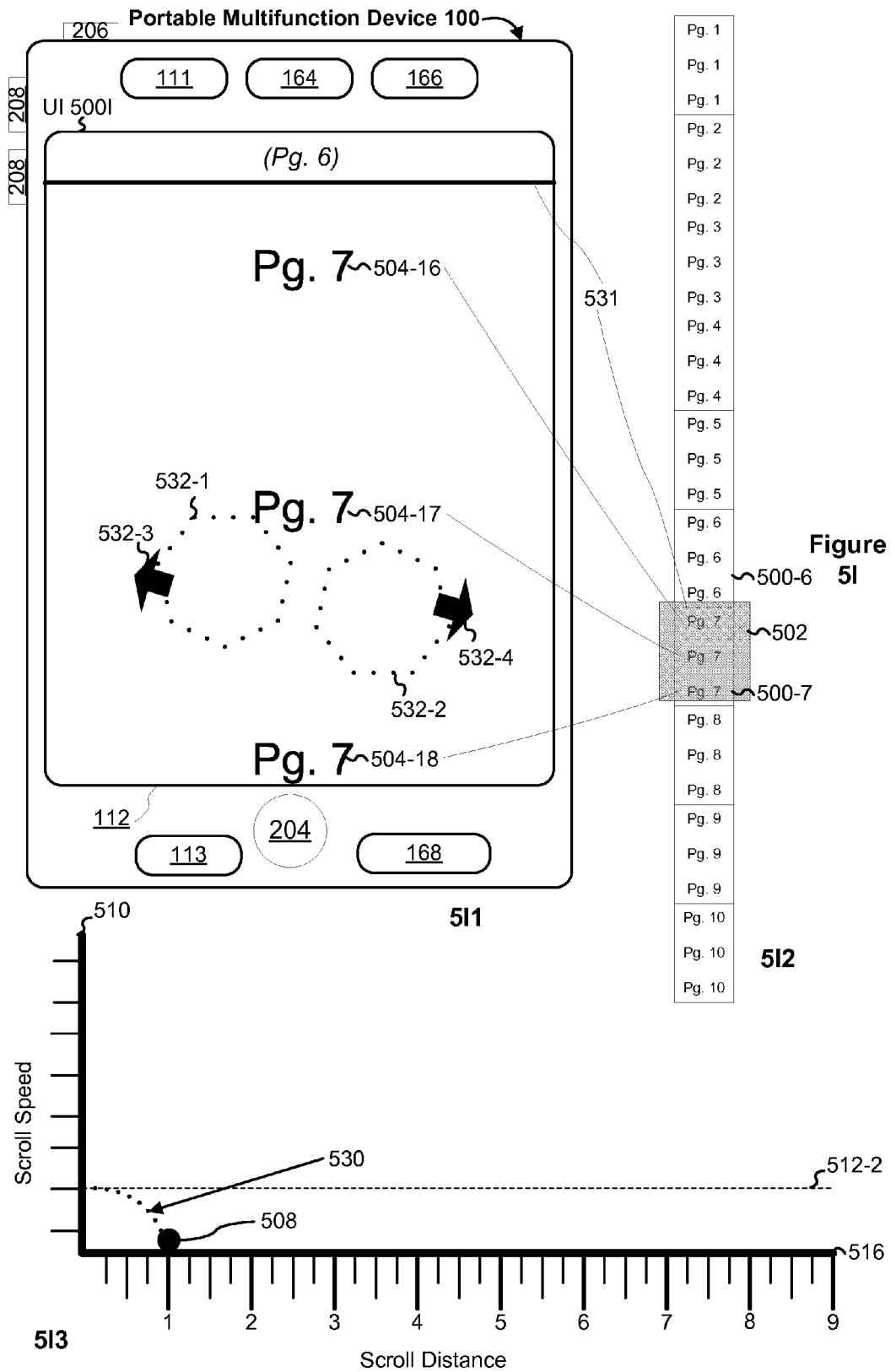
Figure 5K:
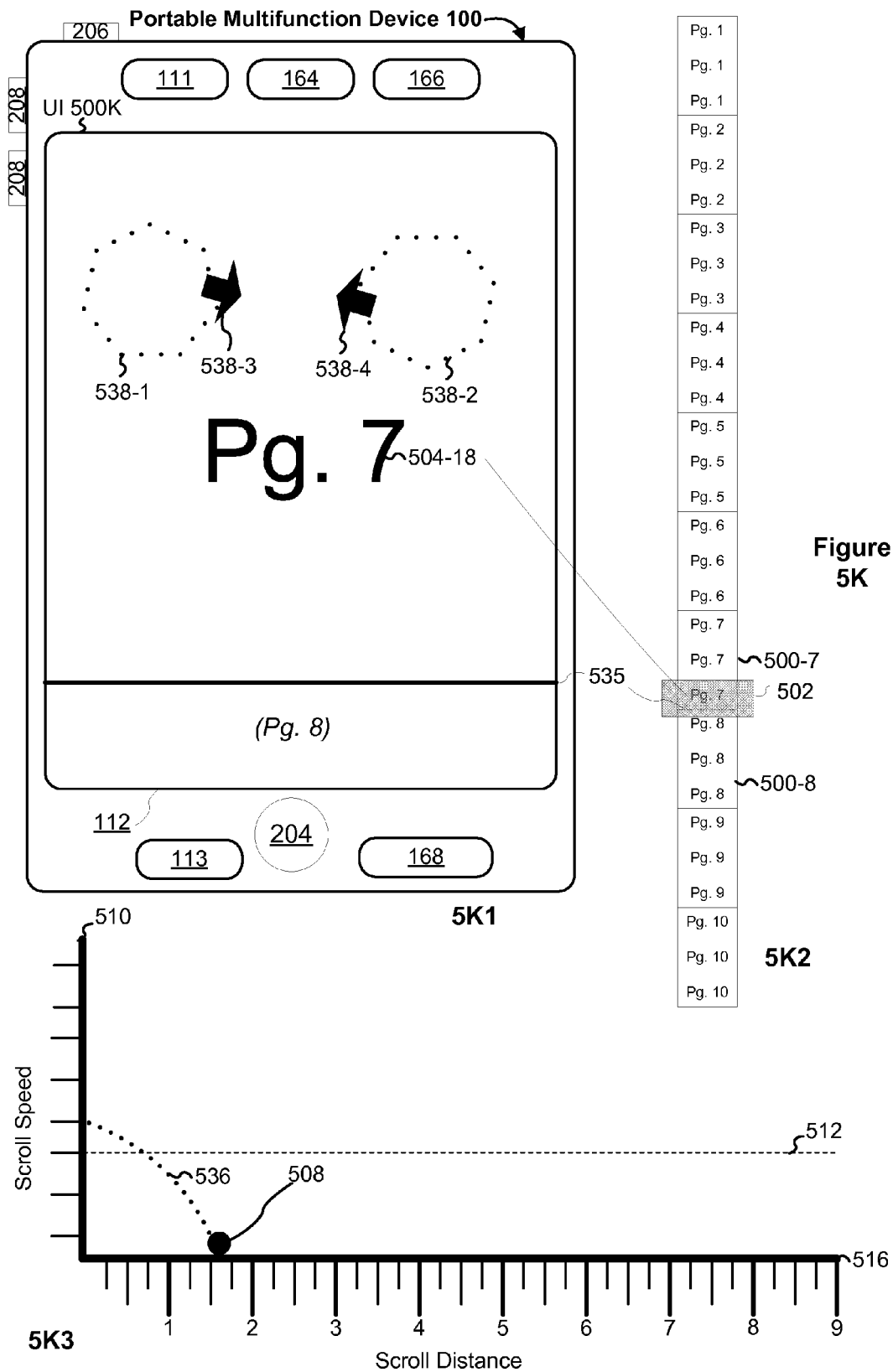
Figure 5L:
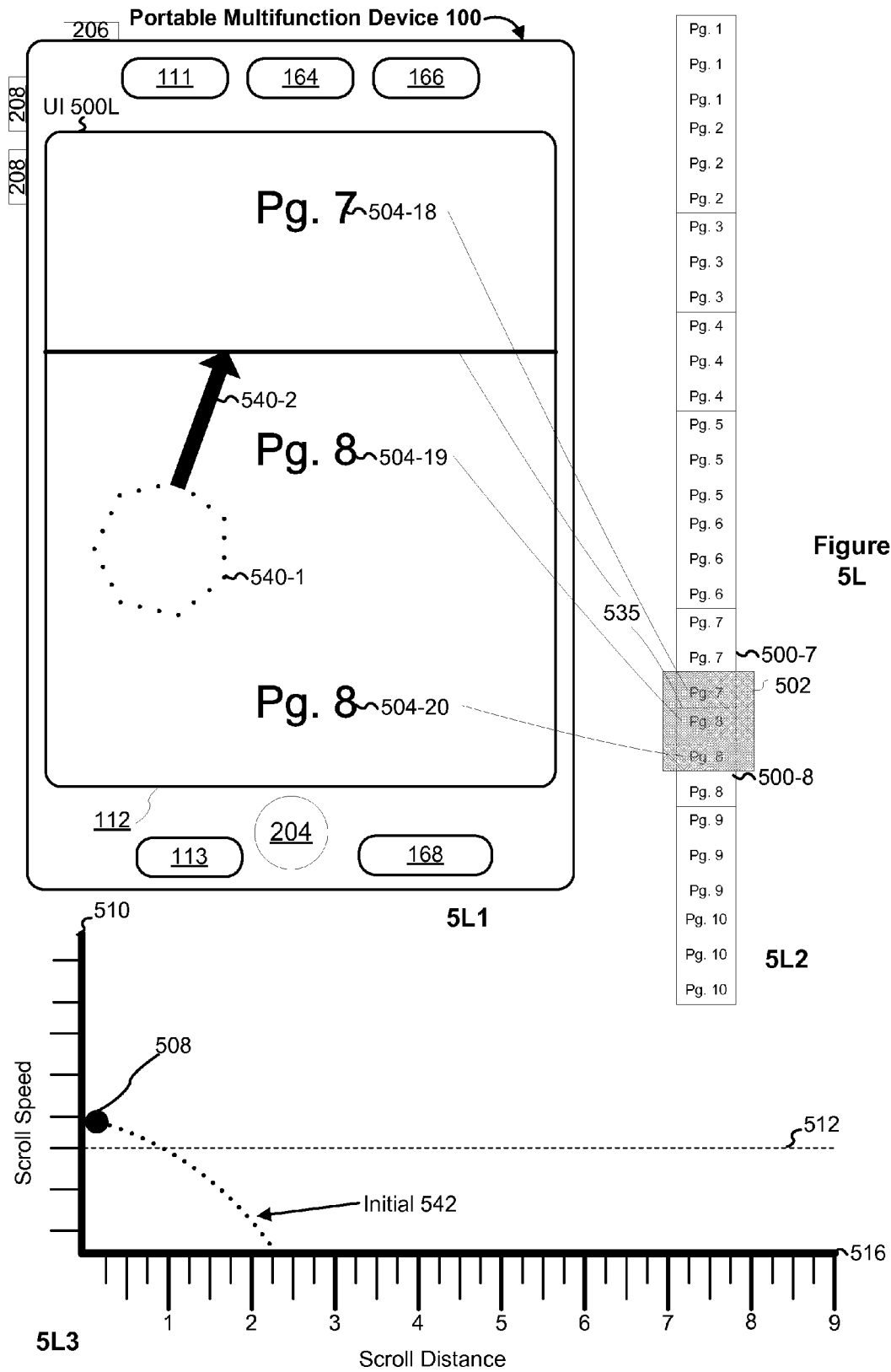
Figure 5M:
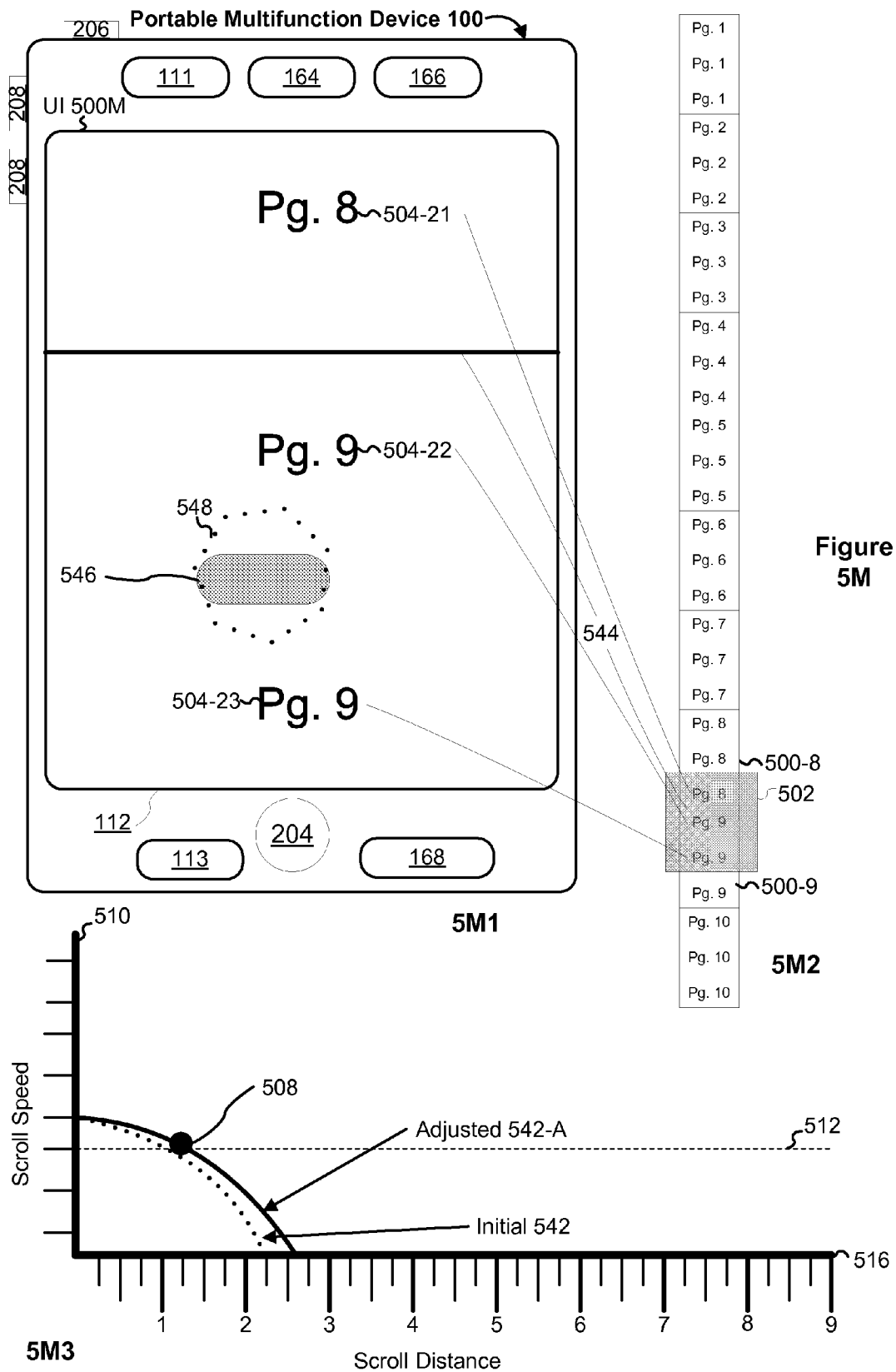
Figure 5N:
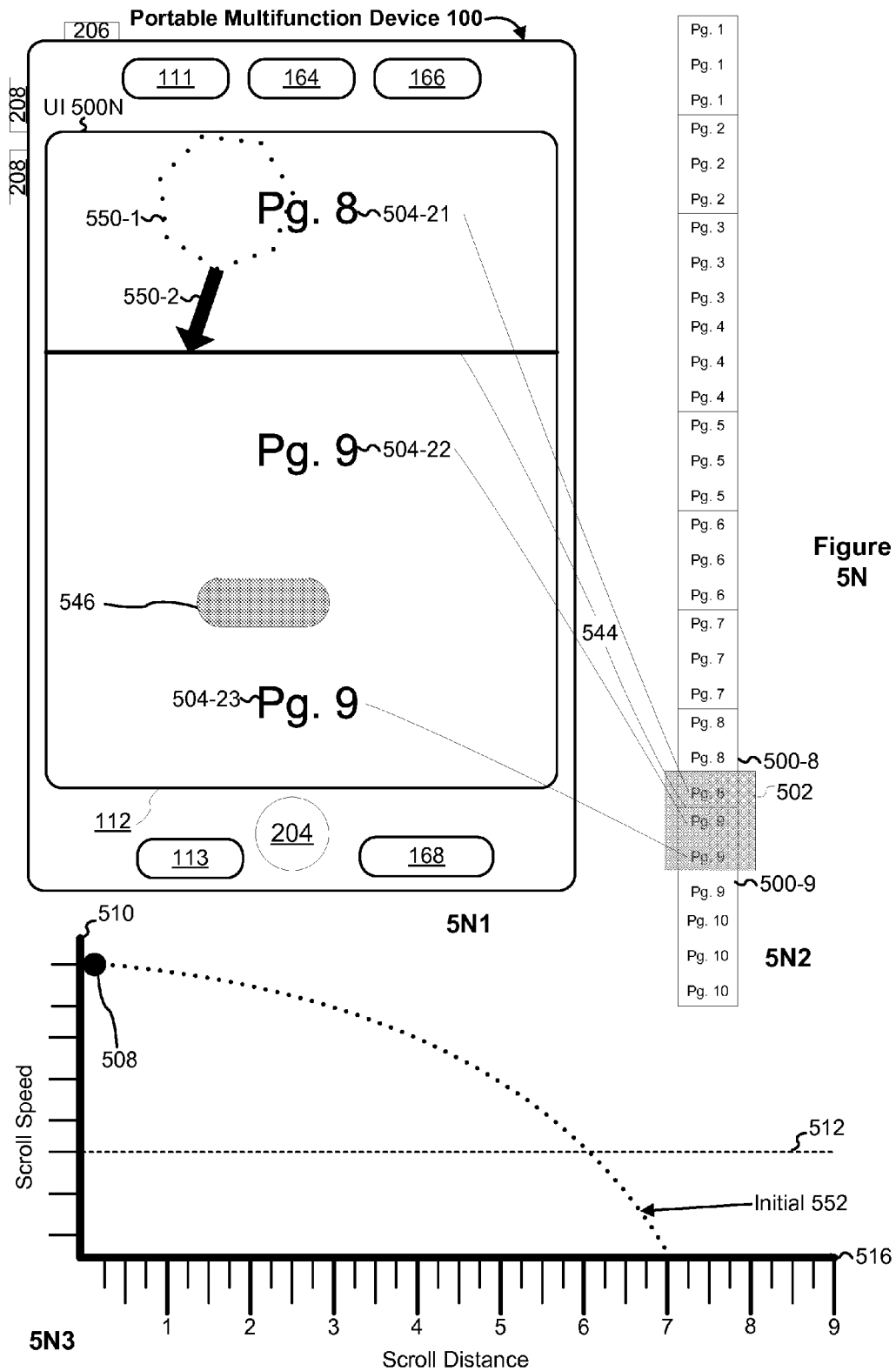
Figure 5O:
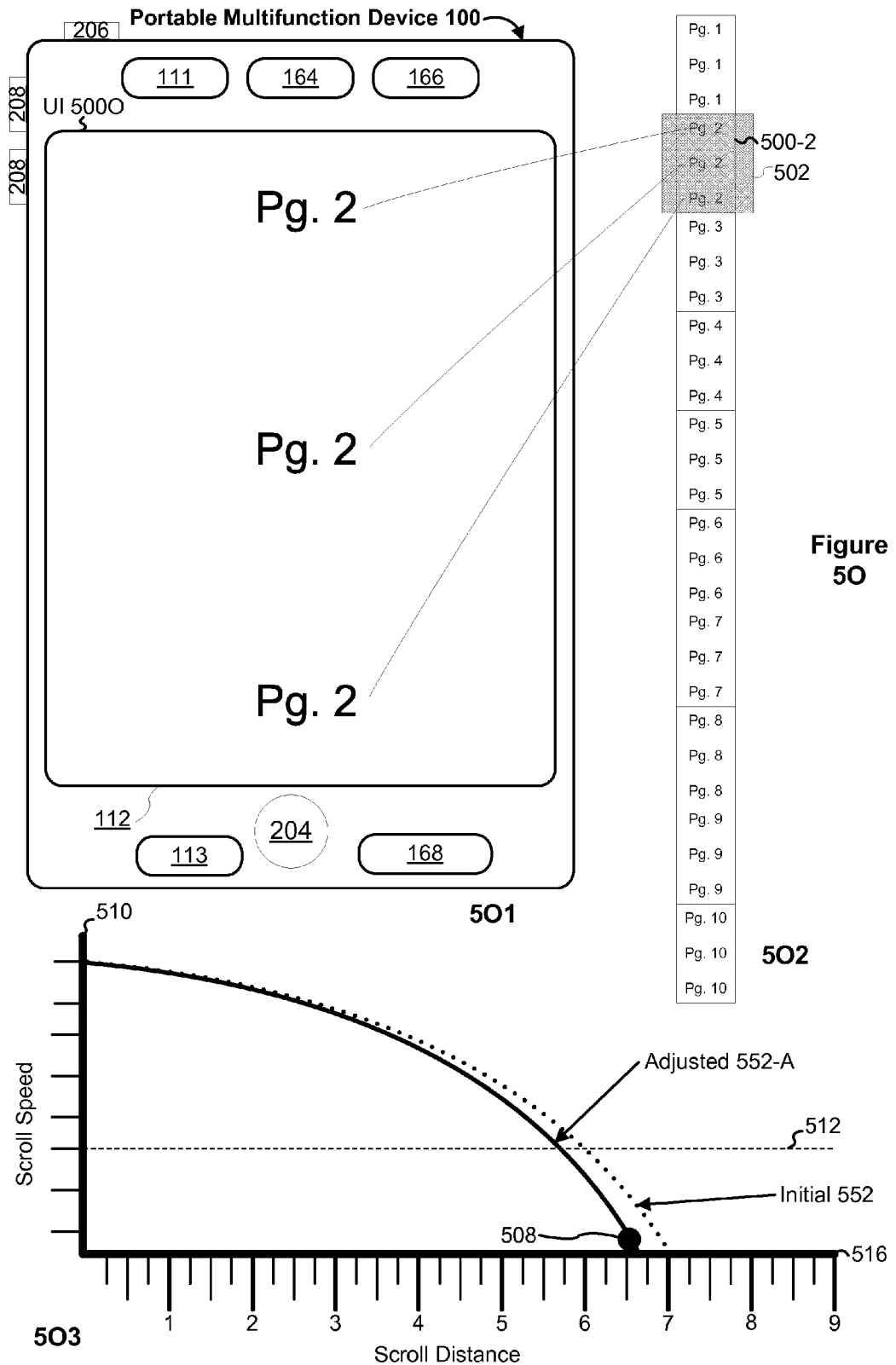

FIGS. 5A-5O illustrate exemplary user interfaces for scrolling multi-section documents in accordance with heuristics for improved electronic document display in accordance with some embodiments. The user interfaces in these figures are used to illustrate the processes described below, including the processes in FIGS. 6A-6E.

Although the exemplary embodiments in FIGS. 5A-5O illustrate the use of swipe gestures (which include flick gestures) in conjunction with scrolling of the electronic document, any suitable gesture may be used with the user interfaces, devices, and methods disclosed herein (e.g., swipe gestures, rotation gestures, etc.).

Each of FIGS. 5A-5O include three sections, which illustrate a portable multifunction device 100 displaying an electronic document that includes a plurality of document sections separated by respective logical structure boundaries, which in this example are pages and page breaks, respectively. The portable multifunction device 100 is displayed in the figures as 5'n'1, where 'n'=the figure letter in the series, e.g., FIG. 5B contains a depiction of portable multifunction device 100 as 5B1. A representation of a complete exemplary electronic document is provided in 5'n'2, where 'n'=the figure letter in the series, e.g., FIG. 5B contains a depiction of the electronic document as 5B2. Additionally, in each of the figures, the exemplary electronic document is displayed in the 5n2 sections of the figures with a coverage mark 502. The coverage mark 502 over part of the complete exemplary electronic document in 5n2 indicates what portion of the electronic document is being viewed on touch screen 112 in 5n1. To give more context in the examples discussed here, exemplary content marks are placed in each document section of the complete electronic document in 5n2. The electronic document's content marks are also displayed on the touch screen 112 in 5n1. Thus, the figures in 5n1 and 5n2 present a synchronized view of the displayed content on touch screen 112 and the conceptual view of navigation within the electronic document.

Finally, the figures contain a scrolling speed versus scrolling distance chart in the 5'n'3 sections of the figures, where 'n'=the figure letter in the series, e.g., FIG. 5B contains a chart 5B3. The charts illustrate a scrolling speed versus scrolling distance curve for certain gestures depicted on the portable multifunction device 100, and how, in some embodiments, the curve may be adjusted in certain circumstances as described below.

FIG. 5A illustrates an exemplary electronic document 500 being displayed on device 100 within user interface UI 500A (section 5A1 of FIG. 5A). The electronic document 500 has 10 pages, 500-1 through 500-10. Page 500-1 is presently displayed, as indicated by: 1) coverage mark 502 in the graphic depiction of the electronic document 5A2; and 2) content marks 504-1, 504-2, and 504-3.

The device detects a swipe gesture 506 with an initial contact 506-1 and swipe motion 506-2 on the touch screen 112 in 5A1. Swipe gesture 506 includes an initial velocity, which, while not depicted directly on the device 100 in 5A1, is represented by the initial location of scroll progress mark 508 on the vertical scroll speed axis 510 of chart 5A3.

A predefined speed threshold 512 is depicted on chart 5A3, and as depicted by the initial location of scroll progress mark 508 on the vertical scroll speed axis 510, the initial velocity of swipe gesture 506 exceeds the predefined speed threshold 512.

Additionally, chart 5A3 depicts a scrolling speed versus scrolling distance function in the form of an initial curve 514 plotted with scroll speed in the vertical axis 510 against scroll distance in the horizontal axis 516.

FIG. 5B depicts that scrolling of the electronic document 500 has been initiated, as coverage mark 502 is now covering portions of page 2 500-2 and page 3 500-3, and UI 500B (section 5B1 of FIG. 5B) shows content mark 504-4 for a portion of page 2, page boundary 518, and content marks 504-5 and 504-6 for a portion of page 3. Additionally, chart 5B3 includes the initial curve 514, as well as an adjusted curve 514-A, that is an altered version of the scrolling speed versus scrolling distance function. As depicted in 5B3, the initial curve 514 indicated a scroll distance of approximately four and two thirds pages by the time the scrolling speed becomes zero, i.e. scrolling stops. The adjusted curve 514-A, however, has been adjusted so that the scroll distance is exactly four pages when the scrolling speed becomes zero. Therefore, in this example of vertical scrolling, the upper page boundary associated with the page to be scrolled to (e.g., page 5) in accordance with the adjusted curve 514-A will be displayed at the top of the display at the end of the scrolling operation initiated by the user's swipe gesture 506. Alternatively, the upper page boundary associated with the page to be scrolled to (e.g., page 5) in accordance with the adjusted curve 514-A will coincide with the top of the display and thus the upper page boundary will not be displayed at the end of the scrolling operation.

Because the initial velocity of the swipe gesture 506 was greater than the predefined speed threshold 512, the electronic document 500 is scrolled in accordance with the adjusted curve 514-A. This is indicated visually in chart 5B3, where the movement of scroll progress mark 508 is on the adjusted curve 514-A, rather than the initial curve 514.

FIG. 5C depicts continued scrolling of the electronic document 500 in accordance with the adjusted curve 514-A in chart 5C3, while UI 500C (section 5C1 of FIG. 5C) shows content marks 504-7 and 504-8 for a portion of page 4, page boundary 520 and content mark 504-9 for a portion of page 5. Scroll progress mark 508 is farther along the adjusted curve 514-A, and lower with respect to vertical scroll speed axis 510, indicating that the scroll speed is continuing to approach zero velocity.

FIG. 5D illustrates that scrolling came to a stop as the scrolling speed became zero. Chart 5D3 depicts scroll progress mark 508 at the end of adjusted curve 514-A, which corresponds to the bottom of the vertical scroll speed axis 510, i.e., no velocity, and at a scroll distance of four document sections, which is four pages in this example. As depicted in 5D2, content marks 504-10, 504-11, and 504-12 are displayed in UI 500D (section 5D1 of FIG. 5D). The coverage mark 502 is now over just page 5 500-5, so that no page boundaries are visible in UI 500D. In this example, an entire document section—page 5 500-5—is displayed on touch screen 112. Moreover, the upper page boundary associated with page 5 500-5 is displayed at the top of the display of touch screen 112, and the lower page boundary associated with page 5 500-5 is displayed at the bottom of the display of touch screen 112. As illustrated in this exemplary embodiment, displaying respective page boundaries at the top and/or bottom of a display means that the page boundaries are not visible. In alternate embodiments, displaying the respective page boundaries at the top and/or bottom of a display means that the respective page boundaries may be visually displayed at or near the extremums of the display.

FIG. 5E depicts the device 100 detecting swipe gesture 522 with an initial contact 522-1 and swipe motion 522-2 on the touch screen 112 in UI 500E (section 5E1 of FIG. 5E). Swipe gesture 522 includes an initial velocity, which is represented by the initial location of scroll progress mark 508 on the vertical scroll speed axis 510 of chart 5E3. As depicted by the initial location of scroll progress mark 508 at the vertical scroll speed axis 510, the initial velocity of swipe gesture 522 does not exceed the predefined speed threshold 512. The initial curve 524 for scrolling speed versus scrolling distance function indicates the distance to be scrolled will be somewhat over one page as indicated on the horizontal scroll distance axis 516.

FIGS. 5F-5G depict the device 100 scrolling the electronic document 500 within UI 500F (section 5F1 of FIG. 5F) in accordance with the initial curve 524 because the initial velocity of the swipe gesture 522 is below the predefined speed threshold. As depicted, the content marks 504-11, 504-12 on page 500-5, page boundary 525 and content mark 504-13 on page 6 500-6 are visible, indicating that the document is scrolling upward. For purposes of illustration, adjusted curve 524-A is also depicted, which would alter the scrolling speed versus scrolling distance function so that the scrolling speed becomes zero as the scrolling ended at one page scrolled.

In UI 500G (section 5G1 of FIG. 5G), the scrolling has stopped with most of page 6 500-6 visible, page boundary 526 near the top of the touch screen 112, and a small part of page 5 500-5 visible above page boundary 526. Content marks 504-13, 504-14, and 504-15 on page 6 500-6 are visible. This comports with the coverage mark 502 in 5G2, and with chart 5G3, where the initial curve 524 indicates that the distance to be scrolled was somewhat over one page as indicated on the horizontal scroll distance axis 516. Note that, because the initial velocity of the swipe gesture 522 is below the predefined speed threshold, scroll progress mark 508 ended on the initial curve 524 at a position slightly greater than one page scrolled, whereas following the adjusted curve 524-A would have resulted in the scrolling stopping with all of page 6 500-6 displayed in UI 500G1.

FIGS. 5H-5I depict an exemplary embodiment where the device 100 detects swipe gesture 528 with an initial contact 528-1 and swipe motion 528-2 on the touch screen 112 in UI 500H (FIG. 5H, section 5H1). Swipe gesture 528 includes an initial velocity, which is represented by the initial location of scroll progress mark 508 on the vertical scroll speed axis 510 of chart 5H3. As depicted by the initial location of scroll progress mark 508 at the vertical scroll speed axis 510, the initial velocity of swipe gesture 528 meets an alternative predefined speed threshold 512-2, which, for purposes of illustration, is different from predefined speed threshold 512. Alternative predefined speed threshold 512-2 is set at, or substantially at, the swipe gesture velocity necessary to scroll the electronic document 500 exactly one page. In this exemplary embodiment, the curve 530 for scrolling speed versus scrolling distance function indicates the distance to be scrolled will be exactly one page as indicated on the horizontal scroll distance axis 516.

FIG. 5I illustrates that in response to swipe gesture 528, the electronic document 500 has been scrolled exactly one page. In chart 513, scroll progress mark 508 ended on the curve 530 at a position corresponding to exactly one page scrolled. Content marks 504-16 through 504-18 are revealed in UI 500I (FIG. 5I, section 5I1), and the portion of the electronic document 500 displayed in UI 500I corresponds to the coverage mark 502 in 512, including page boundary 531.

Note that, since the swipe gesture 528's initial velocity is at, or substantially at, alternative predefined speed threshold 512-2, no adjustment to the scrolling speed versus scrolling distance function was performed.

In some embodiments, the predefined speed threshold 512 is set at, or substantially at, the swipe gesture velocity necessary to scroll an electronic document exactly one page.

UI 500I also illustrates depinch gesture 532, which includes points of contact 532-1 and 532-2, and movements 532-3 and 532-4.

FIG. 5J illustrates that, in response to depinch gesture 532, the electronic document 500 is magnified or zoomed to a magnification level greater than 1.0×. Following depinch gesture 532, UI 500J (FIG. 5J, section 5J1) depicts that page boundary 531 and content mark 504-16 on page 7 500-7 are still visible, as is a small portion of page 6 500-6, but in magnified form. In 5J2, the coverage mark 502 covers corresponding portions of page 6 500-6 and page 7 500-7.

UI 500J also illustrates, that while the electronic document 500 is displayed in magnified form, the device 100 detects a swipe gesture 534 on touch screen 112, which includes a contact 534-1 and a swipe motion 534-2.

Swipe gesture 534 includes an initial velocity, which, while not depicted directly on the device 100 in 5J1, is represented by the initial location of scroll progress mark 508 on the vertical scroll speed axis 510 of chart 5J3.

The previously discussed predefined speed threshold 512 is depicted on chart 5J3, and as depicted by the initial location of scroll progress mark 508 on the vertical scroll speed axis 510, the initial velocity of swipe gesture 534 exceeds the predefined speed threshold 512.

Additionally, chart 5J3 depicts a scrolling speed versus scrolling distance function in the form of a curve 536 plotted with scroll speed in the vertical axis 510 against scroll distance in the horizontal axis 516.

UI 500K (FIG. 5K, section 5K1) depicts that page boundary 535 and content mark 504-18 on page 7 500-7 are visible, as is a small portion of page 8 500-8, but in magnified form. In 5K2, the coverage mark 502 covers corresponding portions of page 7 500-7 and page 8 500-8.

The exemplary embodiment illustrated by FIGS. 5J and 5K indicate, that some embodiments forego adjusting the scrolling speed versus scrolling distance function when the electronic document is displayed at a magnification level greater than a predefined magnification level, (e.g., 1.0×), regardless of whether a swipe gesture exceeds the predefined speed threshold.

UI 500K also depicts a pinch gesture 538, which includes points of contact 538-1 and 538-2, and movements 538-3 and 538-4.

FIG. 5L illustrates that in response to pinch gesture 538, the electronic document 500 is demagnified. In UI 500L (FIG. 5L, section 5L1), content mark 504-18 for a portion of page 7 500-7, page boundary 535, and content marks 504-19 and 504-20 for a portion of page 8 500-8 are visible on touch screen 112, which corresponds to coverage mark 502 over page 7 500-7 and page 8 500-8 in 5L2.

UI 500L depicts the device 100 detecting swipe gesture 540 with an initial contact 540-1 and swipe motion 540-2 on the touch screen 112. Swipe gesture 540 includes an initial velocity, which is represented by the initial location of scroll progress mark 508 on the vertical scroll speed axis 510 of chart 5L3. As depicted by the initial location of scroll progress mark 508 at the vertical scroll speed axis 510, the initial velocity of swipe gesture 540 exceeds the predefined speed threshold 512. The initial curve 542 for scrolling speed versus scrolling distance function indicates the distance to be scrolled will be between two and three pages as indicated on the horizontal scroll distance axis 516, which would result in a portion of page 9 and a portion of page 10 being displayed at the end of the scroll operation.

FIG. 5M depicts that scrolling of the electronic document 500 has been initiated, as coverage mark 502 is now covering portions of page 8 500-8 and page 9 500-9, and UI 500M (FIG. 5M, section 5M1) shows content mark 504-21 for a portion of page 8 500-8, page boundary 544, and content marks 504-22 and 504-23 for a portion of page 9 500-9. Chart 5M3 includes the initial curve 542, as well as an adjusted curve 542-A, that is an altered or modified version of the scrolling speed versus scrolling distance function. The adjusted curve 542-A is generated so that, at the end of the scroll operation (if the scroll operation is allowed to finish), page 10 and only page 10 is being displayed.

UI 500M also illustrates that page 9 500-9 includes an executable icon 546. Touch gesture 548 corresponds to the location of executable icon 546 within the electronic document 500. In some embodiments, such as the specific example illustrated in FIG. 5M, scrolling of the electronic document 500 is terminated in response to detecting a touch gesture on the touch screen 112 at the location corresponding to the executable icon in the electronic document. Further, in response to detecting that the touch gesture corresponds to the location of executable icon 546 within the electronic document, the device 100 follows web links and/or executes function(s), program features, or predefined executable code associated with the executable icon 546 (not depicted in the figures).

UI 500N (FIG. 5N, section 5N1) depicts the device 100 detecting swipe gesture 550 with an initial contact 550-1 and swipe motion 550-2 on the touch screen 112. Swipe gesture 550 includes an initial velocity, which is represented by the initial location of scroll progress mark 508 on the vertical scroll speed axis 510 within chart 5N3. As depicted by the initial location of scroll progress mark 508 at the vertical scroll speed axis 510, the initial velocity of swipe gesture 550 exceeds the predefined speed threshold 512. Furthermore, the initial portion of the document that is displayed, as indicated by coverage mark 502, includes a portion of page 8, a portion of page 9, and a page boundary 544 between pages 8 and 9.

In the exemplary embodiment of FIGS. 5N-5O, the device determines a total scrolling distance based on the initial velocity, wherein the total scrolling distance is adjusted to correspond to a first logical structure boundary in the electronic document. The initial curve 552 that depicts the total scrolling distance indicates that the distance to be scrolled will be about seven pages as indicated on the horizontal scroll distance axis 516, which would result in a final document position in which a portion of page 1 and a portion of page 2 are concurrently displayed.

FIG. 5O illustrates that the device has adjusted the total scrolling distance to correspond to a first logical structure boundary in the electronic document 500, i.e., adjusted curve 552-A in 5O3 ends at a logical structure boundary corresponding to approximately six and two-thirds pages scrolled.

As depicted in UI 500O (FIG. 5O), scrolling came to a stop as the document scrolled the full extent of the adjusted total scrolling distance. Chart 5O3 depicts scroll progress mark 508 at the end of adjusted curve 552-A, which corresponds to the bottom of the vertical scroll speed axis 510, i.e., no velocity, and at a scroll distance of six and two-thirds document sections, i.e., six and two-thirds pages in this example. The coverage mark 502 is now over just page 2 500-2, so that no page boundaries are visible in UI 500O (FIG. 5O1). In this example, an entire document section—page 2 500-2—is displayed on touch screen 112. Moreover, the upper page boundary associated with page 2 500-2 is displayed at the top of the display of touch screen 112, and the lower page boundary associated with page 2 500-2 is displayed at the bottom of the display of touch screen 112.

Figure 6A:
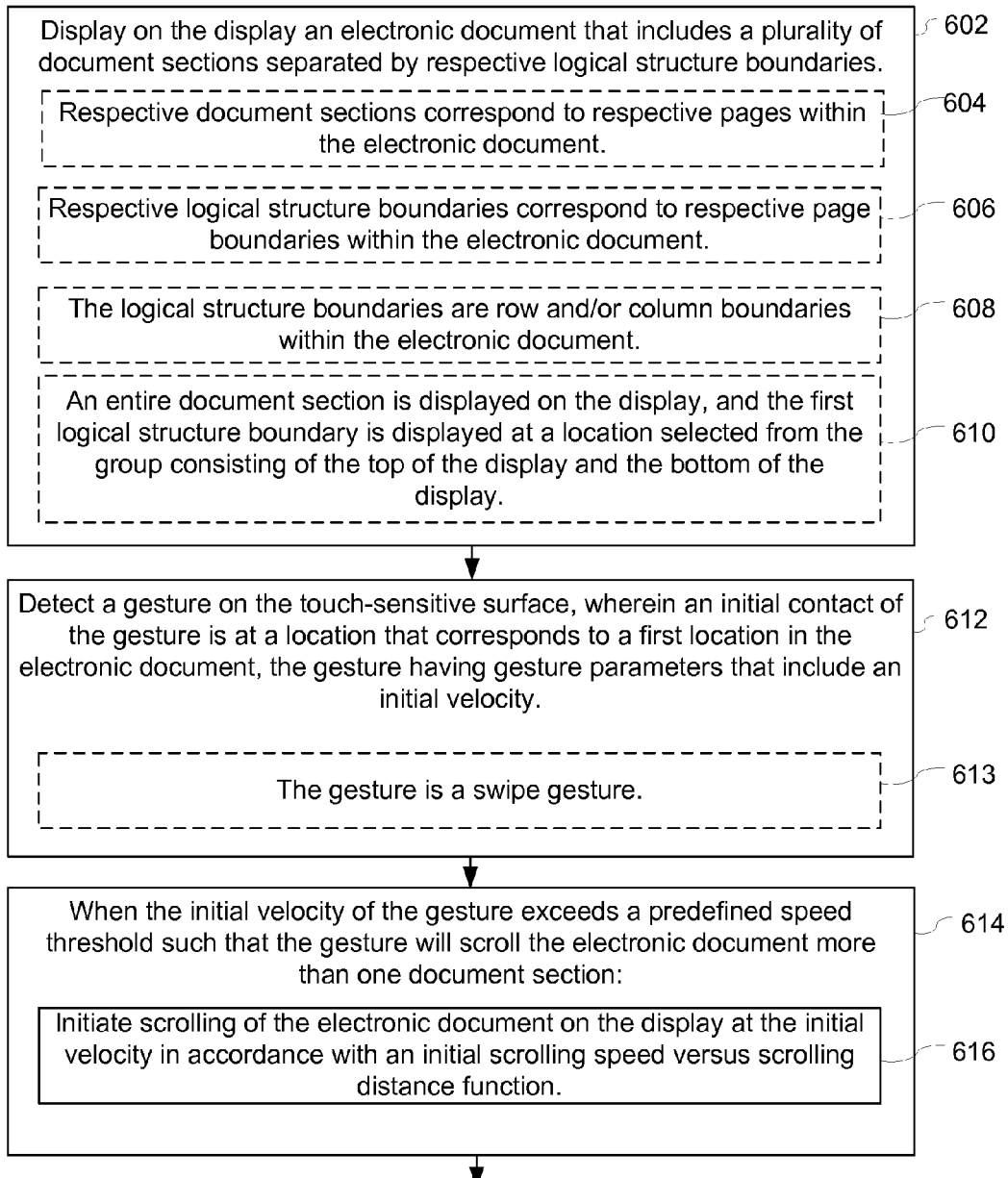
FIGS. 6A-6C are flow diagrams illustrating a method of scrolling multi-section documents in accordance with heuristics for improved electronic document display in accordance with some embodiments.
Figure 6B:
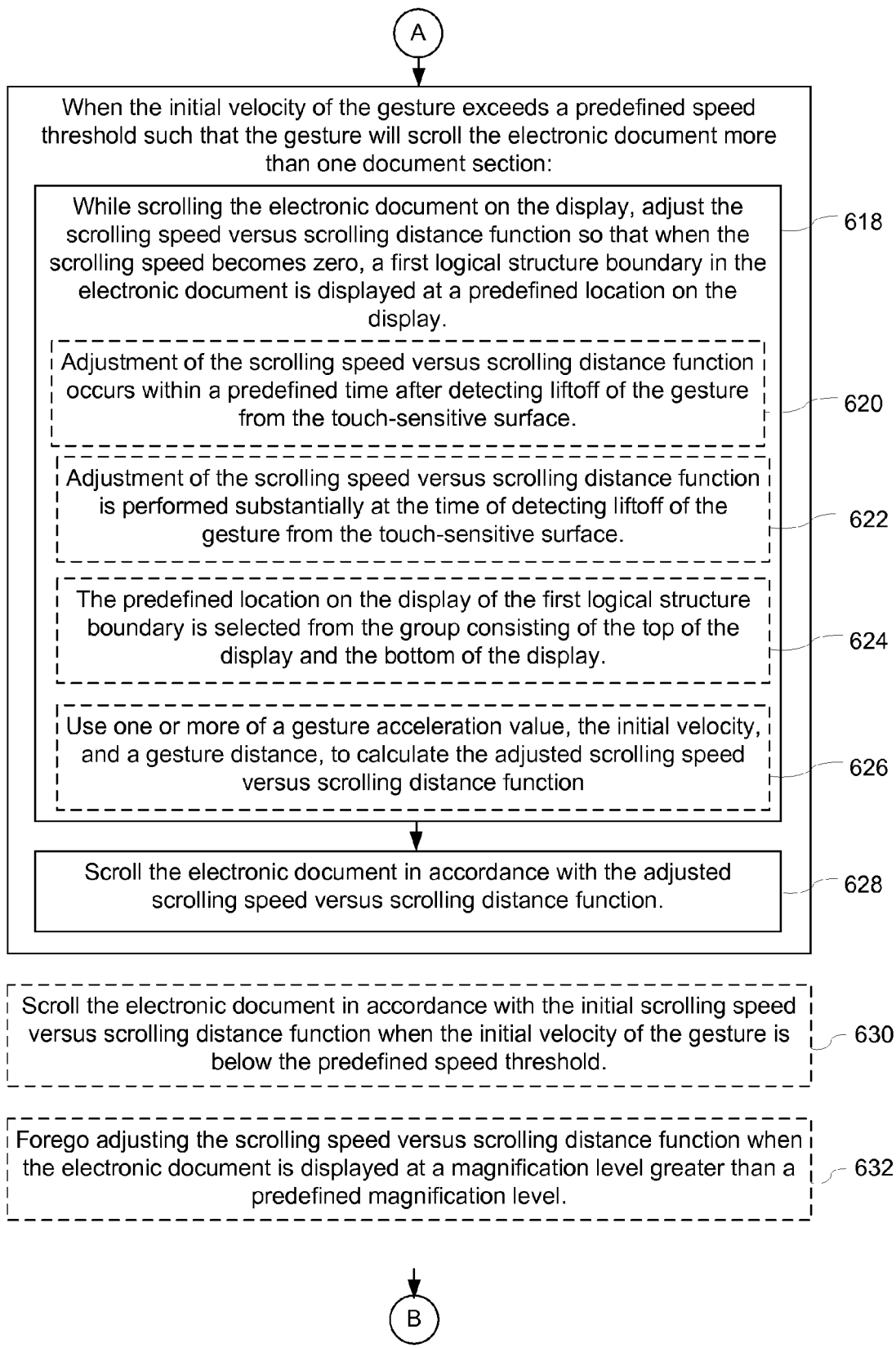
Figure 6C:
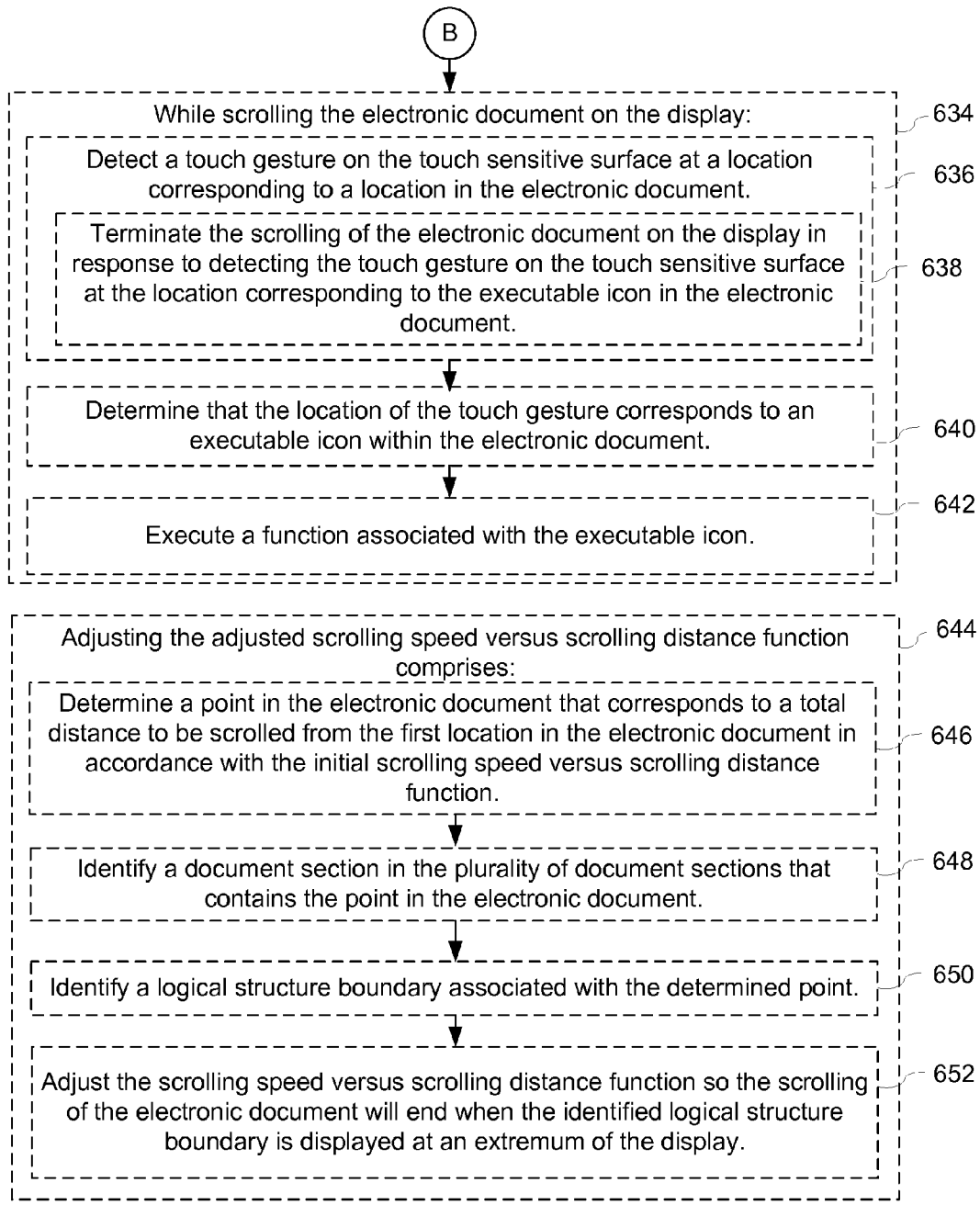

FIGS. 6A-6C are flow diagrams illustrating a method 600 of scrolling multi-section documents in accordance with heuristics for improved electronic document display in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way for users to scroll multi-section documents for improved electronic document display, yet without the need for user recognition of any particular heuristics. The method reduces the cognitive burden on a user when scrolling multi-section documents, thereby creating a more efficient human-machine interface. For battery-operated computing devices, enabling a user to scroll multi-section documents faster and more efficiently conserves power and increases the time between battery charges.

The device displays (602) on the display an electronic document that includes a plurality of document sections separated by respective logical structure boundaries (e.g., FIG. 5A, section 5A1, electronic document 500 displayed on touch screen 112, and multi-section electronic document 500 as represented in FIG. 5A2, where 10 document sections are separated by respective logical structure boundaries, i.e., 10 pages separated by page boundaries).

In some embodiments, respective document sections correspond to respective pages within the electronic document (604) (e.g., multi-section electronic document 500 as represented in FIG. 5A, section 5A2, where 10 document sections are separated by respective logical structure boundaries, i.e., 10 pages separated by page boundaries).

In some embodiments, respective logical structure boundaries correspond to respective page boundaries within the electronic document (606) (e.g., multi-section electronic document 500 as represented in FIG. 5A, section 5A2, where 10 document sections are separated by respective logical structure boundaries, i.e., 10 pages separated by page boundaries).

In some embodiments, the logical structure boundaries are row and/or column boundaries within the electronic document (608). For example, in a spreadsheet or other form of large tabular document, logical structure boundaries are row and column boundaries.

In some embodiments, an entire document section is displayed on the display, and the first logical structure boundary is displayed at a location selected from the group consisting of the top of the display and the bottom of the display (610) (e.g., in FIG. 5A1, page 1 502-1, is displayed in full on touch screen 112, and the top page boundary associated with page 1 502-1, is displayed at the top of touch screen 112.

The device detects (612) a gesture on the touch-sensitive surface, wherein an initial contact of the gesture is at a location that corresponds to a first location in the electronic document, the gesture having gesture parameters that include an initial velocity (e.g., FIG. 5A, section 5A1, swipe gesture 506). The initial velocity gesture parameter may be determined by any of a number of methods, including without limitation, the velocity of the gesture at the time of liftoff, the average velocity of motion during the entire gesture, the fastest velocity detected during the gesture, average velocity above a predefined threshold, average velocity below a predefined threshold, etc.

In some embodiments, the gesture is a swipe gesture (613) (e.g., FIG. 5A, section 5A1, swipe gesture 506).

When the initial velocity of the gesture exceeds, or in some embodiments, is equal to a predefined speed threshold such that the gesture will scroll the electronic document more than one document section (614), a number of steps may be performed, as described below.

The device initiates (616) scrolling of the electronic document on the display at the initial velocity in accordance with an initial scrolling speed versus scrolling distance function (e.g., FIG. 5A, chart 5A3, scrolling speed versus scrolling distance function in the form of an initial curve 514 plotted with scroll speed in the vertical axis 510 against scroll distance in the horizontal axis 516, and scrolling initiated in response to swipe gesture 506 in 5A1 as represented by scroll progress mark 508 on the vertical scroll speed axis 510 in 5A3).

While the device scrolls the electronic document on the display, the device adjusts (618) the scrolling speed versus scrolling distance function so that when the scrolling speed becomes zero (e.g., when the scrolling speed first becomes zero, or when the scrolling speed initially becomes zero), a first logical structure boundary in the electronic document is displayed at a predefined location on the display (e.g., FIG. 5B, chart 5B3 depicts both the initial curve 514 and the adjusted curve 514-A, which is an altered version of the scrolling speed versus scrolling distance function; the adjusted curve 514-A has been adjusted so that the scroll distance is four pages when the scrolling speed becomes zero; as depicted in FIG. 5D, section 5D1, the electronic document 500 has been scrolled from page 1 500-1 to page 5 500-4 at the termination of the scrolling operation).

In some embodiments, adjusting the scrolling speed versus scrolling distance function occurs within a predefined time after detecting liftoff of the gesture from the touch-sensitive surface (620) (e.g., the predefined time may be zero, namely, at liftoff, or at any time following lift off, but not including substantially at, or immediately before, the end of the scrolling of the electronic document).

In some embodiments, adjusting the scrolling speed versus scrolling distance function is performed substantially at the time of detecting liftoff of the gesture from the touch-sensitive surface (622).

In some embodiments, the following method is utilized for adjusting the scrolling speed versus scrolling distance function.

Set velocity0=the initial velocity of the gesture at liftoff.
    Set offset0=the current display location offset.
    Establish initialCurve=scrollingSpeed at time t, given velocity0.
    Set distanceScrolledAtTime_t=∫ scrollingSpeed.
    Set timeAtScrollHalt=time when initialCurve=0 (i.e., scroll halted).
    Set origDestination=distance scrolled according to initialCurve+offset0 at timeAtScrollHalt.
    Set destinationPage=the document section that begins closest to the middle of the display before adjusting initialCurve.
    Set destinationPageTop=the top coordinate of destinationPage.
    Establish adjustedCurve by modifying distanceScrolledAtTime_t so that distanceScrolledAtTime_t given velocity0 at timeAtScrollHalt+offset0=destinationPageTop, by scaling distance according to:

$$((destinationPageTop-offset0)/(origDestination-offset0))$$

In some embodiments, the predefined location on the display of the first logical structure boundary when the scrolling speed becomes zero is selected from the group consisting of the top of the display, the middle of the display, and the bottom of the display (624). In other words, the predefined location on the display that the first logical structure boundary will be displayed at is the top or bottom of the display, or in some embodiments, the middle of the page. This can result in a document section, or page, having its first logical structure boundary, or page break, displayed at the top of the display. Alternatively, this can result in a document section, or page, having its first logical structure boundary, or page break, displayed at the bottom of the display. In some alternative embodiments, this can result in a document section, or page, having its first logical structure boundary, or page break, displayed in the middle of the display.

In some embodiments, the predefined location is coincident with an extremum of the display. In some embodiments, the page is displayed with the first logical structure boundary, or page break, at an edge of the display, and at least a portion of the first logical structure boundary, or page break, is visibly displayed. In some embodiments, substantially all of a page is displayed on the display, and the first logical structure boundary, or page break, is not visibly displayed because its location within the electronic document is adjacent to and beyond an edge of the display. For example, in FIG. 5A, the user interface 5A1 illustrates that page 1 500-1 is displayed on touch screen 112, where page 1 500-1's upper logical structure boundary, or top edge of page 1, is at the top edge of touch screen 112, while page 1 500-1's lower logical structure boundary, or bottom edge of page 1, is at the bottom edge of touch screen 112. In this example, page 1 500-1's logical structure boundaries are not visibly displayed on touch screen 112.

Turning briefly to FIG. 7A, UI 700A illustrates that page 1 500-1 is displayed on touch screen 112, and at least a portion of page 1 500-1's upper logical structure boundary 500-1-A and at least a portion of lower logical structure boundary 500-1-B are displayed at the top and bottom extremums of touch screen 112, respectively. For example, the magnified representation 7A1 of the bottom of touch screen 112 illustrates that above the bottom edge 112-A of touch screen 112, the bottom edge 500-1-B of page 1 500-1 is displayed at the edge of page 500-1.

Alternatively, in some embodiments, such as that illustrated in FIG. 7B, a page fully displayed on the display may include visibly displayed logical structure boundaries. For example, the magnified representation 7B1 of the bottom of touch screen 112 illustrates that above the bottom edge 112-A of touch screen 112, a small portion of page 2 500-2 is visible, along with its respective upper logical structure boundary 500-2-A. Above upper logical structure boundary 500-2-A, the lower logical structure boundary 500-1-B of page 1 500-1 is displayed at the edge of page 500-1.

Returning to the discussion of method 600, in some embodiments, the device uses one or more of a gesture acceleration value, the initial velocity, and a gesture distance, to calculate the adjusted scrolling speed versus scrolling distance function (626).

The device scrolls (628) the electronic document in accordance with the adjusted scrolling speed versus scrolling distance function (e.g., swipe gesture 506 in FIG. 5 section 5A1, followed by scrolling progress as depicted in FIG. 5B section 5B1, FIG. 5C section 5C1, and FIG. 5D section 5D1, and scroll progress mark 508 along adjusted curve 514-A in FIG. 5B chart 5B3, FIG. 5C chart 5C3 and FIG. 5D chart 5D3, respectively).

When the initial velocity of the gesture is below the predefined speed threshold scroll, however, the electronic document is scrolled in accordance with the initial scrolling speed versus scrolling distance function (630) (e.g., FIG. 5E, section 5E1, swipe gesture 522 and initial curve 524 for the scrolling speed versus scrolling distance function is used during electronic document 500 scrolling, followed by scrolling progress as depicted in FIG. 5F section 5F1, and FIG. 5G section 5G1, and scroll progress mark 508 along initial curve 524 in FIG. 5E chart 5E3, and FIG. 5G chart 5G3, respectively).

In some embodiments, the device foregoes (632) adjusting the scrolling speed versus scrolling distance function when the electronic document is displayed at a magnification level greater than a predefined magnification level (e.g., a magnification greater than 1.0×, or any suitable magnification level) (see, e.g., FIG. 5J section 5J1, where electronic document 500 is magnified, and the swipe gesture 534 is detected, but as indicated by 5J3, the initial curve 536 is determined, and the document is scrolled in accordance with the initial curve 536 as depicted in FIG. 5K 5K3).

While the device is scrolling the electronic document on the display (634), the device detects (636) a touch gesture on the touch sensitive surface at a location corresponding to a location in the electronic document (e.g., FIG. 5M chart 5M3 scroll progress mark 508 indicates that electronic document 500 is being scrolled in accordance with adjusted curve 524-A, when a touch gesture 546 is detected as depicted in FIG. 5M section 5M1).

In some embodiments, the device terminates (638) scrolling of the electronic document on the display in response to detecting the touch gesture on the touch sensitive surface at the location corresponding to the executable icon in the electronic document (e.g., as depicted in FIG. 5N section 5N1, the electronic document 500 stopped scrolling in response to touch gesture 546 depicted in FIG. 5M section 5M1, as indicated by both 5M1 and 5N1 displaying the same portion of the electronic document 500).

The device determines (640) that the location of the touch gesture corresponds to an executable icon within the electronic document (e.g., touch gesture 546 is detected as depicted in FIG. 5M section 5M1, and this corresponds to the location of executable icon 546).

The device then executes (642) a function associated with the executable icon (e.g., the device 100 follows web links and/or executes function(s), program features, or predefined executable code associated with the executable icon 546 (not depicted in the figures)).

In some embodiments, when the device adjusts (644) the scrolling speed versus scrolling distance function, the adjustment process comprises the following steps. The device determines (646) a point in the electronic document that corresponds to a total distance to be scrolled from the first location in the electronic document in accordance with the initial scrolling speed versus scrolling distance function. The device identifies (648) a document section in the plurality of document sections that contains the point in the electronic document. The device identifies (650) a logical structure boundary associated with the determined point (e.g., the logical structure boundary associated with the determined point may be the logical structure boundary closest to the determined point, the logical structure boundary immediately above the determined point, or the logical structure boundary immediately below the determined point). The device then adjusts (652) the scrolling speed versus scrolling distance function so the scrolling of the electronic document will end when the identified logical structure boundary is displayed at an extremum of the display.

If the gesture was substantially vertical, the identified logical structure boundary is displayed at a top or bottom extremum of the display. If the gesture was substantially horizontal, the identified logical structure boundary is displayed at a right or left extremum of the display.

Note that many of the details of the processes described above with respect to method 600 (e.g., FIGS. 6A-6C) can also be used in an analogous manner to the methods 660 and 680 described below. For brevity, these details are not repeated below.

FIG. 6D is a flow diagram illustrating a method 660 of scrolling multi-section documents in accordance with heuristics for improved electronic document display in accordance with some embodiments. The method 660 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 660 may be combined and/or the order of some operations may be changed.

As described below, the method 660 provides an intuitive way for users to scroll multi-section documents for improved electronic document display, yet without the need for user recognition of any particular heuristics. The method reduces the cognitive burden on a user when scrolling multi-section documents, thereby creating a more efficient human-machine interface. For battery-operated computing devices, enabling a user to scroll multi-section documents faster and more efficiently conserves power and increases the time between battery charges.

The device displays (662) on the display an electronic document that includes a plurality of document sections separated by respective logical structure boundaries (e.g., FIG. 5A section 5A1, electronic document 500 displayed on touch screen 112, and multi-section electronic document 500 as represented in FIG. 5A section 5A2, where 10 document sections are separated by respective logical structure boundaries, i.e., 10 pages separated by page boundaries).

The device detects (664) a gesture on the touch-sensitive surface, wherein an initial contact of the gesture is at a location that corresponds to a first location in the electronic document, the gesture having gesture parameters that include an initial velocity (e.g., FIG. 5A section 5A1, swipe gesture 506).

When the initial velocity of the gesture exceeds or is equal to a predefined speed threshold such that the gesture will scroll the electronic document more than one document section (666), a number of steps may be performed, as described below.

The device initiates (668) scrolling of the electronic document on the display at the initial velocity in accordance with an initial scrolling speed versus scrolling distance function (e.g., FIG. 5A chart 5A3, scrolling speed versus scrolling distance function in the form of an initial curve 514 plotted with scroll speed in the vertical axis 510 against scroll distance in the horizontal axis 516, and scrolling initiated in response to swipe gesture 506 in 5A1 as represented by scroll progress mark 508 on the vertical scroll speed axis 510 in chart 5A3).

While scrolling the electronic document on the display, the device determines (670) a total scrolling distance based on the initial velocity, wherein the total scrolling distance is adjusted to correspond to a first logical structure boundary in the electronic document (e.g., FIG. 5O illustrates that the device adjusted total scrolling distance corresponds to a first logical structure boundary in the electronic document 500, i.e., adjusted curve 552-A in chart 5O3 ends at a logical structure boundary corresponding to approximately six and two-thirds pages scrolled).

In some embodiments, the device performs adjustments (672) of the total scrolling distance substantially at the time of detecting liftoff of the gesture from the touch-sensitive surface.

The device then scrolls (674) the electronic document for the total scrolling distance (e.g., FIG. 5O section 5O1 where electronic document 500 displays page 2 500-2 with its respective page boundaries at the extremums of the display 112, and 5O3, where the scroll progress mark 508 is on the adjusted curve 552-A at zero velocity with respect to scroll speed axis 510, and at approximately six and two-thirds document sections with respect to the scroll distance axis 516).

Figure 6E:
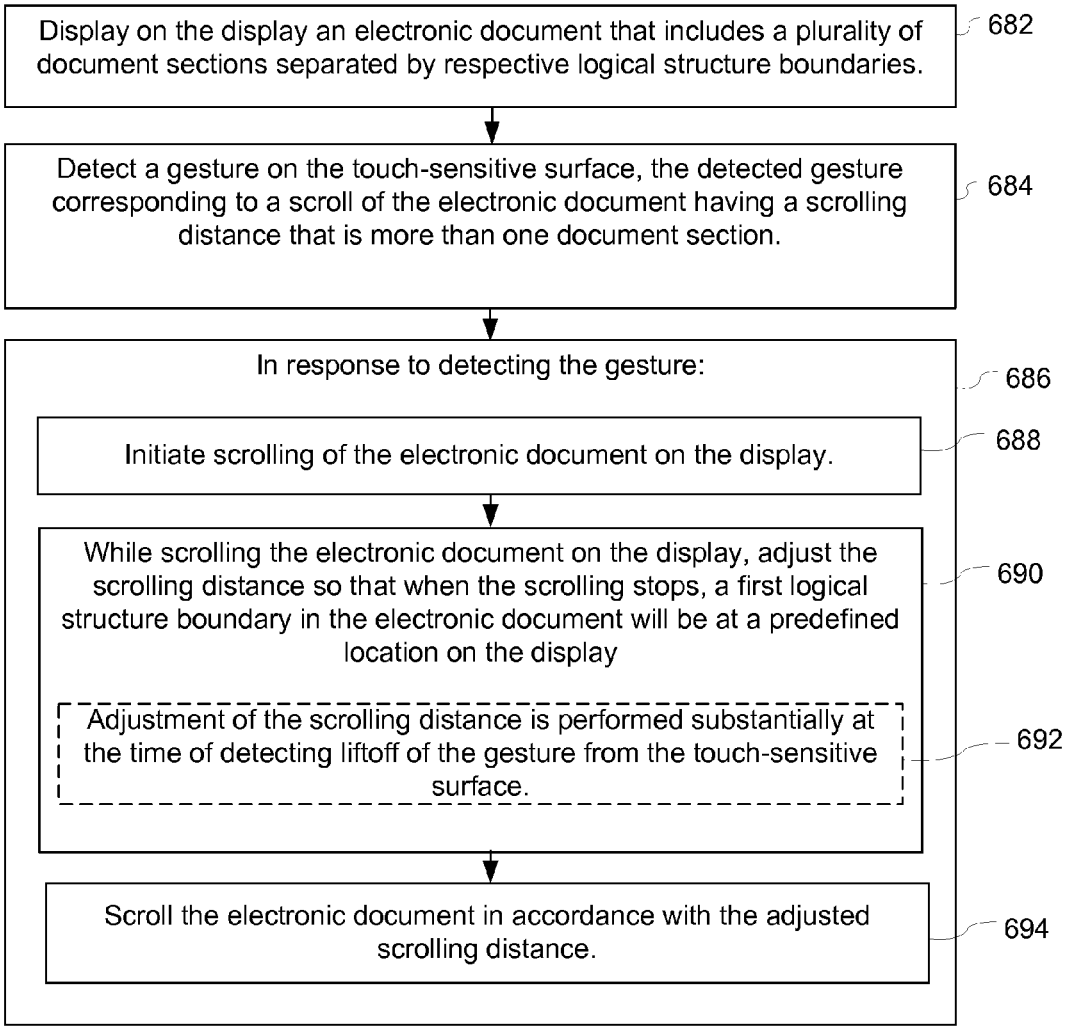
FIG. 6E is a flow diagram illustrating a method of scrolling multi-section documents in accordance with heuristics for improved electronic document display in accordance with some embodiments.

FIG. 6E is a flow diagram illustrating a method 680 of scrolling multi-section documents in accordance with heuristics for improved electronic document display in accordance with some embodiments. The method 680 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 680 may be combined and/or the order of some operations may be changed.

As described below, the method 680 provides an intuitive way for users to scroll multi-section documents for improved electronic document display, yet without the need for user recognition of any particular heuristics. The method reduces the cognitive burden on a user when scrolling multi-section documents, thereby creating a more efficient human-machine interface. For battery-operated computing devices, enabling a user to scroll multi-section documents faster and more efficiently conserves power and increases the time between battery charges.

The device displays (682) on the display an electronic document that includes a plurality of document sections separated by respective logical structure boundaries (e.g., FIG. 5A, section 5A1, electronic document 500 displayed on touch screen 112, and multi-section electronic document 500 as represented in FIG. 5A2, where 10 document sections are separated by respective logical structure boundaries, i.e., 10 pages separated by page boundaries).

The device detects (684) a gesture on the touch-sensitive surface, the detected gesture corresponding to a scroll of the electronic document having a scrolling distance that is more than one document section (e.g., FIG. 5A, section 5A1, swipe gesture 506).

In response to detecting the gesture (686), the device initiates (688) scrolling of the electronic document on the display (e.g., FIG. 5A, chart 5A3, scrolling is represented by initial curve 514 plotted with scroll speed in the vertical axis 510 against scroll distance in the horizontal axis 516, and scrolling initiated in response to swipe gesture 506 in 5A1 as represented by scroll progress mark 508 on the vertical scroll speed axis 510 in 5A3).

While scrolling the electronic document on the display, the device adjusts (690) the scrolling distance so that when the scrolling stops, a first logical structure boundary in the electronic document will be at a predefined location on the display (e.g., FIG. 5B, chart 5B3 depicts both the initial curve 514 and the adjusted curve 514-A, which alters the scrolling distance so that the scroll distance is four pages when the scrolling stops, and thus, a logical structure boundary will be a predefined location on the display, i.e., the top of touch screen 112).

In some embodiments, adjustment of the scrolling distance is performed substantially at the time of detecting liftoff of the gesture from the touch-sensitive surface (692).

The device scrolls (694) the electronic document in accordance with the adjusted scrolling distance (e.g., swipe gesture 506 in FIG. 5 section 5A1, followed by scrolling progress as depicted in FIG. 5B section 5B1, FIG. 5C section 5C1, and FIG. 5D section 5D1, and scroll progress mark 508 along adjusted curve 514-A in FIG. 5B chart 5B3, FIG. 5C chart 5C3 and FIG. 5D chart 5D3, respectively).

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a multifunction device with a display and a touch-sensitive surface:
   displaying on the display an electronic document that includes a plurality of document sections separated by respective logical structure boundaries;
   detecting a gesture on the touch-sensitive surface, wherein an initial contact of the gesture is at a location that corresponds to a first location in the electronic document, the gesture having gesture parameters that include an initial velocity;
   when the initial velocity of the gesture exceeds a predefined speed threshold such that the gesture will scroll the electronic document more than one document section:
   initiating scrolling of the electronic document on the display at the initial velocity in accordance with an initial scrolling speed versus scrolling distance function;
   while scrolling the electronic document on the display, adjusting the scrolling speed versus scrolling distance function so that when the scrolling speed becomes zero, a first logical structure boundary in the electronic document is displayed at a predefined location on the display; and
   scrolling the electronic document in accordance with the adjusted scrolling speed versus scrolling distance function.

2. The method of claim 1, wherein adjusting the scrolling speed versus scrolling distance function occurs within a predefined time after detecting liftoff of the gesture from the touch-sensitive surface.

3. The method of claim 1, wherein adjusting the scrolling speed versus scrolling distance function is performed substantially at the time of detecting liftoff of the gesture from the touch-sensitive surface.

4. The method of claim 1, the predefined location on the display of the first logical structure boundary when the scrolling speed becomes zero is selected from the group consisting of the top of the display and the bottom of the display.

5. The method of claim 1, wherein an entire document section is displayed on the display, and the first logical structure boundary is displayed at a location selected from the group consisting of the top of the display and the bottom of the display.

6. The method of claim 1, further comprising using one or more of a gesture acceleration value, the initial velocity, and a gesture distance, to calculate the adjusted scrolling speed versus scrolling distance function.

7. The method of claim 1, further comprising scrolling the electronic document in accordance with the initial scrolling speed versus scrolling distance function when the initial velocity of the gesture is below the predefined speed threshold.

8. The method of claim 1, further comprising foregoing adjusting the scrolling speed versus scrolling distance function when the electronic document is displayed at a magnification level greater than a predefined magnification level.

9. The method of claim 1, further comprising:
   while scrolling the electronic document on the display:
   detecting a touch gesture on the touch sensitive surface at a location corresponding to a location in the electronic document;

determining that the location of the touch gesture corresponds to an executable icon within the electronic document; and executing a function associated with the executable icon.

10. The method of claim 9, further comprising terminating the scrolling of the electronic document on the display in response to detecting the touch gesture on the touch sensitive surface at the location corresponding to the executable icon in the electronic document.

11. The method of claim 1, wherein respective document sections correspond to respective pages within the electronic document.

12. The method of claim 1, wherein respective logical structure boundaries correspond to respective page boundaries within the electronic document.

13. The method of claim 1, wherein the logical structure boundaries are row and/or column boundaries within the electronic document.

14. The method of claim 1, wherein adjusting the adjusted scrolling speed versus scrolling distance function comprises:
determining a point in the electronic document that corresponds to a total distance to be scrolled from the first location in the electronic document in accordance with the initial scrolling speed versus scrolling distance function;
identifying a document section in the plurality of document sections that contains the point in the electronic document;
identifying a logical structure boundary associated with the determined point;
adjusting the scrolling speed versus scrolling distance function so the scrolling of the electronic document will end when the identified logical structure boundary is displayed at an extremum of the display.

15. The method of claim 1, wherein the gesture is a swipe gesture.

16. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying on the display an electronic document that includes a plurality of document sections separated by respective logical structure boundaries;
detecting a gesture on the touch-sensitive surface, wherein an initial contact of the gesture is at a location that corresponds to a first location in the electronic document, the gesture having gesture parameters that include an initial velocity;
when the initial velocity of the gesture exceeds a predefined speed threshold such that the gesture will scroll the electronic document more than one document section:
initiating scrolling of the electronic document on the display at the initial velocity in accordance with an initial scrolling speed versus scrolling distance function;
while scrolling the electronic document on the display, adjusting the scrolling speed versus scrolling distance function so that when the scrolling speed becomes zero, a first logical structure boundary in the electronic document is displayed at a predefined location on the display; and
scrolling the electronic document in accordance with the adjusted scrolling speed versus scrolling distance function.

17. The multifunction device of claim 16, wherein adjusting the scrolling speed versus scrolling distance function occurs within a predefined time after detecting liftoff of the gesture from the touch-sensitive surface.

18. The multifunction device of claim 16, wherein adjusting the scrolling speed versus scrolling distance function is performed substantially at the time of detecting liftoff of the gesture from the touch-sensitive surface.

19. The multifunction device of claim 16, wherein the predefined location on the display of the first logical structure boundary when the scrolling speed becomes zero is selected from the group consisting of the top of the display and the bottom of the display.

20. The multifunction device of claim 16, wherein an entire document section is displayed on the display, and the first logical structure boundary is displayed at a location selected from the group consisting of the top of the display and the bottom of the display.

21. The multifunction device of claim 16, further comprising scrolling the electronic document in accordance with the initial scrolling speed versus scrolling distance function when the initial velocity of the gesture is below the predefined speed threshold.

22. A method, comprising:
at a multifunction device with a display and a touch-sensitive surface:
displaying on the display an electronic document that includes a plurality of document sections separated by respective logical structure boundaries;
detecting a gesture on the touch-sensitive surface, wherein an initial contact of the gesture is at a location that corresponds to a first location in the electronic document, the gesture having gesture parameters that include an initial velocity;
when the initial velocity of the gesture exceeds a predefined speed threshold such that the gesture will scroll the electronic document more than one document section:
initiating scrolling of the electronic document on the display at the initial velocity in accordance with an initial scrolling speed versus scrolling distance function;
while scrolling the electronic document on the display, determining a total scrolling distance based on the initial velocity, wherein the total scrolling distance is adjusted to correspond to a first logical structure boundary in the electronic document; and,
scrolling the electronic document for the total scrolling distance.

23. The method of claim 22, wherein adjustment of the total scrolling distance is performed substantially at the time of detecting liftoff of the gesture from the touch-sensitive surface.

24. A method, comprising:
at a multifunction device with a display and a touch-sensitive surface:
displaying an electronic document that includes a plurality of document sections separated by respective logical structure boundaries;
detecting a gesture on the touch-sensitive surface, the detected gesture corresponding to a scroll of the electronic document having a scrolling distance that is more than one document section;

in response to detecting the gesture:

initiating scrolling of the electronic document on the display;

while scrolling the electronic document on the display, adjusting the scrolling distance so that when the scrolling stops, a first logical structure boundary in the electronic document will be at a predefined location on the display; and, scrolling the electronic document in accordance with the adjusted scrolling distance.

25. The method of claim 24, wherein adjustment of the scrolling distance is performed substantially at the time of detecting liftoff of the gesture from the touch-sensitive surface.

* * * * *